United States Patent
Yoshida

(10) Patent No.: US 8,266,679 B2
(45) Date of Patent: Sep. 11, 2012

(54) INFORMATION PROCESSING APPARATUS AND INFORMATION PROCESSING SYSTEM

(75) Inventor: Fumiaki Yoshida, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1051 days.

(21) Appl. No.: 12/230,228

(22) Filed: Aug. 26, 2008

(65) Prior Publication Data

US 2009/0057402 A1 Mar. 5, 2009

(30) Foreign Application Priority Data

Aug. 27, 2007 (JP) ................................ 2007-220316

(51) Int. Cl.
*G06F 7/04* (2006.01)

(52) U.S. Cl. ........... 726/4; 726/2; 726/5; 726/6; 726/20; 713/155; 713/168; 713/170; 713/172; 380/241; 705/44

(58) Field of Classification Search .............. 726/2, 406, 726/20, 4, 5, 6; 713/155, 168, 170, 172; 380/241; 705/44

See application file for complete search history.

(56) References Cited

U.S. PATENT DOCUMENTS

| | | | | |
|---|---|---|---|---|
| 2002/0135658 A1* | 9/2002 | Minowa et al. | ................ | 347/187 |
| 2002/0157022 A1* | 10/2002 | Katada et al. | ................. | 713/201 |
| 2005/0105122 A1* | 5/2005 | Sakai | ........................... | 358/1.14 |
| 2005/0225791 A1* | 10/2005 | Lee | ............................. | 358/1.14 |
| 2006/0109493 A1* | 5/2006 | Toda | .......................... | 358/1.13 |
| 2006/0222352 A1* | 10/2006 | Kawase et al. | ................. | 396/15 |
| 2006/0290981 A1* | 12/2006 | Oh | ............................... | 358/1.15 |
| 2008/0072052 A1* | 3/2008 | Suzuki | ......................... | 713/176 |
| 2011/0083012 A1* | 4/2011 | Choi | ........................... | 713/166 |

FOREIGN PATENT DOCUMENTS

| | | |
|---|---|---|
| JP | 08-083153 | 3/1996 |
| JP | 2001-256010 | 9/2001 |
| JP | 2001-337803 | 12/2001 |

* cited by examiner

*Primary Examiner* — April Shan
*Assistant Examiner* — Joseph Pan
(74) *Attorney, Agent, or Firm* — Rabin & Berdo, P.C.

(57) ABSTRACT

An information processing system is supplied capable of holding a security; and transferring an output authority which is had by a transfer source portability terminal to a transfer destination portability terminal. In the information processing system, a transfer source sending section for sending authority information to the transfer destination portability terminal for transferring output authority is furnished in a transfer source portability terminal; a transfer destination receiving section for receiving the authority information from the transfer source portability terminal, a transfer destination storing section for storing the received authority information, and a transfer destination sending section for sending authority information to the information processing apparatus are furnished in a transfer destination portability terminal; and an apparatus receiving section for receiving the authority information from the transfer destination portability terminal, a releasing section for releasing an output limitation according to the received authority information and an outputting section for performing an output based on the data are furnished in an information processing apparatus.

24 Claims, 13 Drawing Sheets

| RECEPTION NUMBER | PRINT DATA |
|---|---|
| 00000001 | PRINT DATA 1 |
| 00000002 | PRINT DATA 2 |
| 00000003 | PRINT DATA 3 |
| 00000004 | PRINT DATA 4 |
| 00000005 | PRINT DATA 5 |
| ⋮ | ⋮ |

*FIG. 2*

| RECEPTION NUMBER | REGISTRATION ID | JOB ID |
|---|---|---|
| 00000001 | 0123456789abcdef | 001a2b3c4d5e1234 |
| 00000002 | 0123456789abcdef | 001a2b3c4d5e1235 |
| 00000003 | 0123456789abcdef | 0011223344550001 |
| 00000004 | 0123456789012345 | 001a2b3c4d5e1111 |
| 00000005 | 0123456789012345 | 0011223344551001 |
| ⋮ | ⋮ | ⋮ |

*FIG. 3*

| RECEPTION NUMBER | REGISTRATION ID | JOB ID | TRANSFER DESTINATION ID |
|---|---|---|---|
| 00000001 | 0123456789abcdef | 001a2b3c4d5e1234 | 0123456789098765 |
| 00000002 | 0123456789abcdef | 001a2b3c4d5e1235 | |
| 00000003 | 0123456789abcdef | 0011222334455001 | |
| 00000004 | 0123456789012345 | 001a2b3c4d5e1111 | 0123456789ffffff |
| 00000005 | 0123456789012345 | 0011222334455101 | 0123456789faebdc |
| ... | ... | ... | ... |

*FIG. 11*

INFORMATION PROCESSING APPARATUS AND INFORMATION PROCESSING SYSTEM

BACKGROUND OF THE INVENTION

1. Field of the Invention

The invention relates to an information processing apparatus and an information processing system that read out authentication information from non-contact type storing medium and perform an output of data, especially, reads out authentication information from portability terminal.

2. Related Background Art

In recent years, an image forming system that is jointly used by plural users is widely spread in office environment and so on. The image forming system is composed of an image forming apparatus such as multiplex equipment having a printer, a printer section and a scanner section and a host computer being connected to the image forming apparatus through network. The image forming apparatus performs an output of a print object on the basis of image data sent from the host computer.

Because such image forming apparatus is jointly used by plural users, for example, when printing secret document including secret information, the outputted print object is seen by other people or taken intentionally by other people, thereby, the image forming apparatus has a risk of leaking secret information.

In order to avoid such secret leakage, until now, before an output of the print object in the image forming apparatus, a technique of authentication print is utilized to judge whether or not user is person having print authority. For example, in the technique indicated in the stated later patent document 1, the host computer adds password to print data serving as image data and sends it to a print server serving as an information processing apparatus. The print server stores the print data and the password when receiving the print data appended the password. Next, when the password is inputted through keyboard, the print server judges whether or not the inputted password agrees with the password that was appended to the print data. Then, only when judged that they agree, the print server further judges that the user who inputted the password is the person having the print authority and sends the print data to a printer to execute a printing process.

By the way, a participation plan person who prepares to take the printed secret document to participate a meeting of enterprise office far from self office uses a method of the authentication print stated above for avoiding the loss of the secret document in movement. In the case, the participation plan person sends the image data of the secret document previously to the image forming apparatus that was set up by the enterprise from the computer of the office to store it. Then, after arriving in the enterprise office, in the image forming apparatus, the print authority is performed to execute the print of the secret document.

Patent document 1: Japan patent publication 08-083153.

However, when the participation plan person stated above, moves from office to the enterprise, for example, because encountering such as accident, traffic jam and train delay, so he/she cannot be in time to participate meeting or cannot attend the meeting through the image data of the secret document is stored in the image forming apparatus of the enterprise, other meeting participation peoples who do not have the print authority are impossible to execute the print and to get the secret document.

Therefore, the information processing apparatus and the information processing system are desired that can hold the security and can transfer the print authority that is had by one user to other users.

SUMMARY OF THE INVENTION

It is, therefore, an object of the invention to provide an information processing apparatus and an information processing system capable of solving the above problem.

An aspect of the invention provides an information processing apparatus to receive data having an output limitation from a host apparatus and store the data. The information processing apparatus comprises a first receiving section for receiving transfer end information from a transfer source portability terminal which holds authority information representing release authority of the output limitation, the transfer end information for presenting transfer end of the authority information to a transfer destination portability terminal; an apparatus storing section for storing the received transfer end information; a second receiving section for receiving the authority information and terminal discrimination information of the transfer destination portability terminal from the transfer destination portability terminal; a judging section for judging whether or not the received authority information is effective on the basis of the received terminal discrimination information and the received transfer end information; a releasing section for releasing the output limitation when judged that it is effective; and an outputting section for performing an output on the basis of the data.

Another aspect of the invention provides an information processing system. The information processing system comprises an information processing apparatus for receiving data having an output limitation from a host apparatus and storing the data; a transfer source portability terminal for holding authority information representing release authority of the output limitation; and a transfer destination portability terminal which can communicate with the transfer source portability terminal, wherein the transfer source portability terminal includes a transfer source sending section for sending the authority information to the transfer destination portability terminal in order to transfer the release authority; the transfer destination portability terminal includes a transfer destination receiving section for receiving the authority information from the transfer source portability terminal, a transfer destination storing section for storing the received authority information, and a transfer destination sending section for sending the authority information to the information processing apparatus; and the information processing apparatus includes an apparatus receiving section for receiving the authority information from the transfer destination portability terminal, a releasing section for releasing the output limitation on the basis of the received authority information, and an outputting section for performing an output on the basis of the data.

EFFECT OF THE PRESENT INVENTION

According to the information processing system of the present invention, because it is possible to transfer the release authority from the transfer source portability terminal that has the release authority to the transfer destination portability terminal through sending the authority information, so the convenience is improved. Further, According to the information processing apparatus of the present invention, because the authority information is received from the transfer destination portability terminal and the validity of the authority information is judged before performing a output of data, so the secret leakage is prevented and the security is held.

The above and other objects and features of the present invention will become apparent from the following detailed description and the appended claims with reference to the accompanying drawings.

BRIEF DESCRIPTION OF THE DRAWINGS

FIG. 2 is an explanatory diagram for showing a structure of a print data storing section;

FIG. 3 is an explanatory diagram for showing a structure of a list storing section in embodiment 1;

FIG. 11 is an explanatory diagram for showing a structure of a list storing section in embodiment 2;

DETAILED DESCRIPTION OF THE PREFERRED EMBODIMENTS

Embodiments of the invention will be described in detail hereinbelow with reference to the drawings.

Embodiment 1

Figure 1:
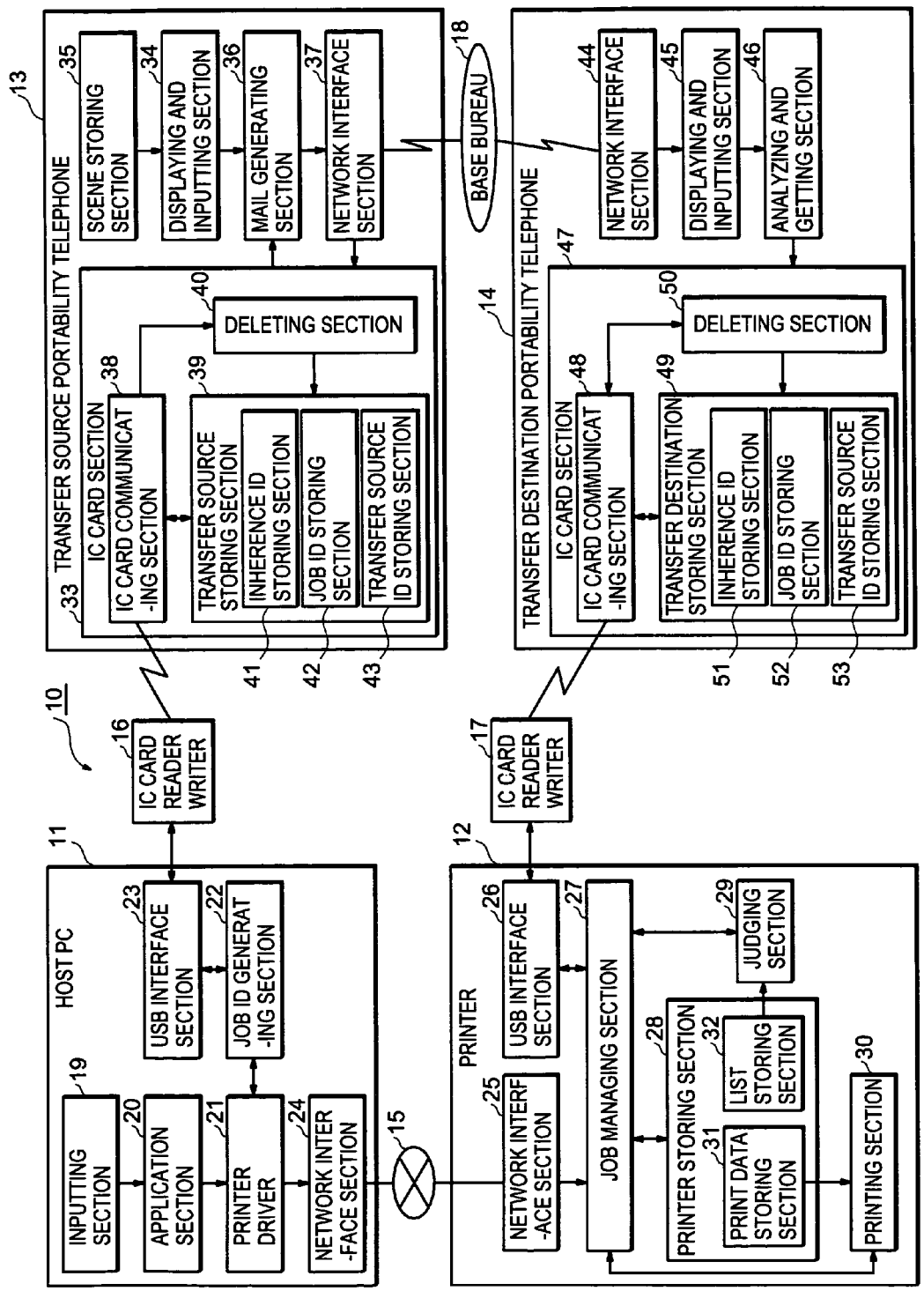
FIG. 1 is a block diagram for showing a structure of a printer system in embodiment 1 of the present invention.

FIG. 1 is a block diagram for showing a structure of a printer system in embodiment 1 of the present invention.

A printer system 10 of the present embodiment, as shown by FIG. 1, is formed by a host PC 11, a printer 12, a transfer source portability telephone 13 and a transfer destination portability telephone 14. Moreover, the transfer source portability telephone 13, as a first portable terminal, is a transfer source portability terminal; and the transfer destination portability telephone, as a second portable terminal, is a transfer destination portability terminal.

Through using the printer system 10, it is possible to execute an authentication print process which performs a print by judging whether or not the user has a print authority.

In embodiment 1, the host PC 11 is formed from a personal computer, as a host apparatus that can communicate with the printer 12 through internet 15, as shown by FIG. 1, includes an inputting section 19, an application section 20, a printer driver 21, a Job ID generating section 22, a USB interface section 23 and a network interface section 24.

The inputting section 19, for example, is formed from a keyboard, and inputs an authentication print demand for demanding the authentication print performing the print time authentication in the printer 12. The inputted authentication print demand is sent to the application section 20.

The application section 20 is a processing section for performing, for example, a make, a read and an edit of manuscript, receives the input of the authentication print demand from the inputting section 19 and sends the manuscript data for the authentication print together with the authentication print demand to the printer driver 21.

The printer driver 21 is a processing section for generating print job, when receiving the authentication print demand and the manuscript data from the application section 20, sends a generation demand of job ID for discriminating the print job and a getting demand of inherence ID that is stated later for print time authentication in the printer 12 to the Job ID generating section 22. Then, the printer driver 21, when receiving the job ID and the inherence ID from the Job ID generating section 22, changes the received manuscript data from the application section 20 into a printer language, generates print data, assigns the job ID and the inherence ID to the print data, and generates a print job. The printer driver section 21 sends the generated print job to the network interface section 24.

The job ID generating section 22, when receiving the generation demand of the job ID and the getting demand of the inherence ID from the printer driver 21, transmits the getting demand of the inherence ID to the USB interface section 23. Then, when receiving inherence ID from the USB interface section 23, it generates the job ID, sends the job ID and the inherence ID to the printer driver 21 and sends the job ID to the USB interface section 23.

The job ID that is generated by the Job ID generating section 22 is discrimination information of 16 bytes that is assigned to each print job. In the present embodiment, for distinguishing from other host PC, a MAC (Media Access Control) address of the host PC 11 is assigned to the front 12 places of the Job ID. Then, in the remainder 4 places, an issue number that was issued by the Job ID generating section 22 is assigned. For example, when the MAC address of the host PC 11 is "001a2b3c4d5e" and the issue number is "1234", the Job ID generating section 22 generates "001a2b3c4d5e1234".

In the USB interface section 23, an IC card reader writer 16 is connected to USB.

The IC card reader writer 16 has a function to detect an approaching IC (Integrated Circuit) card; and to perform a sending and receiving of data with the IC card by wireless communication; in the present embodiment, receives the inherence ID from an IC card section 33 of the transfer source portability telephone 13 and sends it to the USB interface section 23; receives the Job ID from the USB interface section 23 and sends it to the IC card section 33 of the transfer source portability telephone 13.

The USB interface section 23 sends the inherence ID that received from the IC card reader writer 16 to the Job ID generating section 22. Further, it sends the Job ID that received from the Job ID generating section 22 to the IC card section 33 of the transfer source portability telephone 13 through the IC card reader writer 16.

The network interface section 24 sends a print job that received from the printer driver 21 to the printer 12 through the internet 15.

The printer 12, as an information processing apparatus, as shown by FIG. 1, includes a network interface section 25, a USB interface section 26, a job managing section 27, a printer storing section 28, a judging section 29 and a printing section 30.

The network interface section 25 receives a print job from the host PC 11 through the internet 15 and sends it to the job managing section 27.

In the USB interface section 26, an IC card reader writer 17 is connected to USB.

The IC card reader writer 17 has a function of wireless communication with an IC card, in the present embodiment, as an apparatus receiving section, receives the inherence ID, the job ID and the transfer source ID from the IC card section 47 of the transfer destination portability telephone 14 and sends them to the USB interface section 26. Further, as an apparatus sending section, it receives a deletion instruction (mentioned below) from the USB interface section 26 and sends it to the IC card section 47 of the transfer destination portability telephone 14.

The USB interface section 26 sends the inherence ID, the job ID and the transfer source ID that are received from the IC card reader writer 17 to the Job managing section 27. Further, the USB interface section 26 sends the deletion instruction that is received from the job managing section 27 to the IC card section 47 of the transfer destination portability telephone 14 through the IC card reader writer 17.

The Job managing section 27 has a function to manage the print job, concerning the print job that is received from the network interface section 25, issues a reception number and extracts the inherence ID, the job ID and the print data from the print job. Then, the job managing section 27 regards the extracted inherence ID as a registration ID and sends the issued reception number, the registration ID, the job ID and the print data to the printer storing section 28 for storing.

The printer storing section 28 has a function serving as an apparatus storing section and has a print data storing section 31 and a list storing section 32.

The print data storing section 31 is a storing section that correspondingly stores the reception number and the print data that are received from the job managing section 27.

FIG. 2 is an explanatory diagram for showing a structure of a print data storing section.

In the print data storing section 31, as shown by FIG. 2, the print data is stored to correspond to the reception number.

As shown by FIG. 2, in the print data storing section 31, for example, to correspond to the reception number "00000001", the print data "print data 1" is stored.

The list storing section 32 is a storing section that correspondingly stores the reception number, the registration ID and the job ID that are received from the job managing section 27.

FIG. 3 is an explanatory diagram for showing a structure of a list storing section in embodiment 1.

In the list storing section 32, as shown by FIG. 3, corresponding to the reception number, the registration ID and the job ID are stored.

As shown by FIG. 3, in the list storing section 32, for example, corresponding to the reception number "00000001", the registration ID "0123456789abcdef" and the job ID "001a2b3c4d5e1234" are stored.

Further, the job managing section 27 receives the inherence ID, the job ID and the transfer source ID from the USB interface section 26, stores them and sends the job ID and the transfer source ID to the judging section 29. Then, the job managing section 27, when notified that the print authority is existent and of the reception number by the judging section 29, as a releasing section, sends a print instruction and the reception number to the printing section 30. Further, when notified that the print authority is inexistent from the judging section 29, the job managing section 27 makes a displaying section (not shown) display a message notifying that the print cannot be performed.

Furthermore, the job managing section 27, when notified of the print end and the reception number, generates the job ID and the deletion instruction of the transfer source ID concerning the transfer destination portability telephone 14 and sends them to the USB interface section 26.

The judging section 29, when receiving the job ID and the transfer source ID from the transfer destination portability telephone 14 through the job managing section 27, judges whether or not the print authority of the transfer destination portability telephone 14 is existent. That is, the judging section 29 searches the list storing section 32 on the basis of the job ID that is received from the job managing section 27 and reads out the registration ID that is correspondingly stored. Then, the judging section 29 compares the read registration ID with the transfer source ID that is received from the job managing section 27 and judges whether or not the registration ID agrees with the transfer source ID. When judged that they agree, the judging section 29 judges that the print authority of the transfer destination portability telephone 14 is existent; reads out the corresponding reception number from the list storing section 32; and notifies the job managing section 27 of a judgment result and the reception number. Further, when judged that they disagree, the judging section 29 judges that the print authority of the transfer destination portability telephone 14 is inexistent; and notifies the job managing section 27 of the judgment result.

The printing section 30, as an outputting section, when receiving the print instruction and the reception number from the job managing section 27, reads out the print data that is stored in the print data storing section 31 corresponding to the reception number and perform a print onto a record medium.

The transfer source portability telephone 13 is formed from a portability telephone that has an IC card function, as shown by FIG. 1, includes an IC card section 33, a displaying and inputting section 34, a scene storing section 35, an mail generating section 36 and an network interface section 37.

The IC card section 33 is an IC card function part in the transfer source portability telephone 13, as shown by FIG. 1, includes an IC card communicating section 38, a transfer source storing section 39 and a deleting section 40.

The IC card communicating section 38 has a function of wireless communication with the IC card reader writer 16, gets electric source supply by non-contact from the IC card reader writer 16, reads out the inherence ID from the transfer source storing section 39 and sends it to the IC card reader writer 16. Further, the IC card communicating section 38 receives the job ID from the IC card reader writer 16 and writes it in the transfer source storing section 39.

The transfer source storing section 39 is formed from IC chips that stores data in block unit indicating that one block is composed of 16 bytes, as shown by FIG. 1, has 3 blocks that is composed of an inherence ID storing section 41, a job ID storing section 42 and a transfer source ID storing section 43.

The inherence ID storing section 41 is formed from a block that can read out but cannot write in, is a storing section for storing the inherence ID serving as terminal discrimination information that was assigned to the IC card section 33 of the transfer source portability telephone 13. In the present embodiment, the inherence ID of the transfer source portability telephone 13 stored in the inherence ID storing section 41, is "0123456789abcdef".

The inherence ID that was assigned to the IC card section of each portability telephone, in the present embodiment, as the authority information representing the print authority of the portability telephone, is used in print time authentication. Here, the inherence ID is inherence discrimination information of 16 bytes that is distributed to each IC card, as stated above, is impossible to rewrite and delete.

The job ID storing section 42 which is a storing section formed from a block that can read out and write in, and is used for storing the job ID received by the IC card communicating section 38 from the IC card reader writer 16 that is connected to the host PC 11.

The transfer source ID storing section 43 is formed from a block that can read out and write in, when transferred the print authority from other portability telephone, is a storing section for storing the inherence ID of the portability telephone of the transfer source as a transfer source ID. In the present embodiment, in the transfer source ID storing section 43 of the transfer source portability telephone 13, the transfer source ID is not stored.

The deleting section 40 has a function to delete all the data through writing data "00000000000000000000" into the block of the transfer source storing section 39; when got a deletion instruction from the mail generating section 36, deletes the job ID from the job ID storing section 42 of the transfer source storing section 39.

The displaying and inputting section 34, for example that is composed of liquid crystal display and input button. The displaying and inputting section 34 has a function representing each scene stored in the scene storing section 35 and a function to input the authority transfer demand for transferring, the print authority of the print job whose job ID is stored in the job ID storing section 42. In the FIG. 4, an example of a transfer destination setting scene displayed on the displaying and inputting section 34, is represented.

Figure 4:
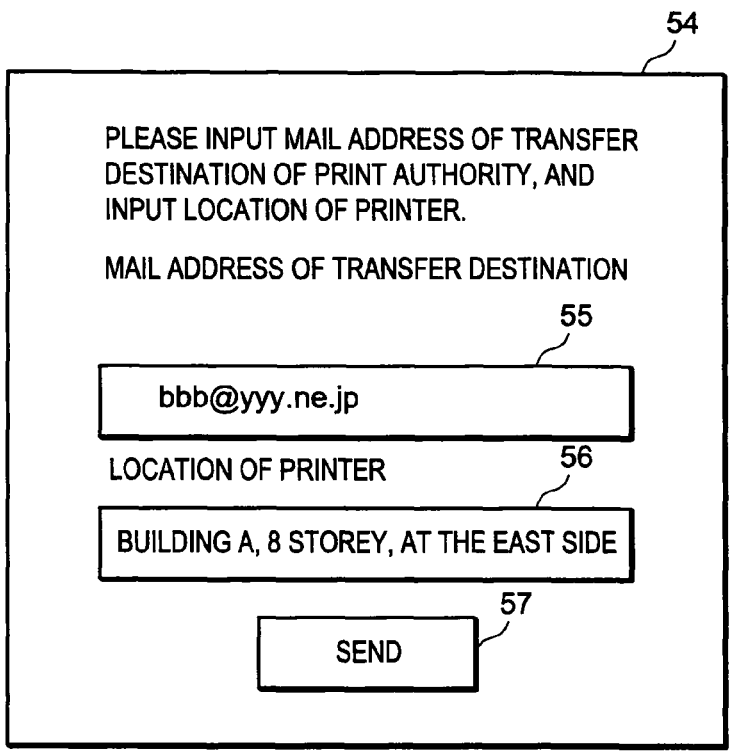
FIG. 4 is an explanatory diagram for showing a transfer destination setting scene.

FIG. 4 is an explanatory diagram for showing a transfer destination setting scene.

A transfer destination setting scene 54, as shown by FIG. 4, has an address input field 55 for inputting an electronic mail address of the transfer destination portability telephone 14 as a transfer destination mail address in order to appoint the transfer destination portability telephone 14 as the transfer destination of the print authority and a location input field 56 for inputting a printer location information in order to notify the transfer destination portability telephone 14 of the location information of the printer 12. Further, in the transfer destination setting scene 54, a "sending" button 57 for selecting a sending of the electronic mail in order to transfer the print authority, is displayed.

In the transfer destination setting scene 54 (FIG. 4), when the "sending" button 57 is selected, the displaying and inputting section 34 inputs the authority transfer demand, the transfer destination mail address "bbb@yyy.ne.jp" that was inputted in the address input field 55 and the printer location information "building A, 8-storey, at the eastward" that was inputted in the location input field 56 and sends them to the mail generating section 36.

The scene storing section 35 is a storing section that stores scene information of each scene for displaying in the displaying and inputting section 34.

The mail generating section 36 has a function to generate a mail data for transferring the print authority to the transfer destination portability telephone 14 when the authority transfer demand, the transfer destination mail address and the printer location information are inputted. In a mail data generated by the mail generating section 36, a transfer source notification scene (mentioned below) is included in order to notify of an electronic mail address of the transfer source portability telephone 13, namely, a transfer source mail address and the printer location information that was received from the displaying and inputting section 34; and the job ID of the print job transferring the print authority and the inherence ID of the transfer source portability telephone 13 serving as the authority information are included. The generated mail data and the inputted transfer destination mail address are sent to the network interface section 37. Moreover, in the present embodiment, the electronic mail address of the transfer source portability telephone 13, namely, the transfer source mail address is set as "aaa@xxx.ne.jp".

The network interface section 37, as a transfer source sending section, has a function to perform a communication by the electronic mail with the transfer destination portability telephone 14 through base bureau 18. The network interface section 37 sends the mail data by the electronic mail on the basis of the transfer destination mail address when receiving the mail data and the transfer destination mail address from the mail generating section 36.

The transfer destination portability telephone 14 is formed from a portability telephone having an IC card function, as shown by FIG. 1, includes an network interface section 44, a displaying and inputting section 45, an analyzing and getting section 46 and an IC card section 47.

The network interface section 44, as a transfer destination receiving section, has a function to perform a communication by the electronic mail with the transfer source portability telephone 13 through base bureau 18. The network interface section 44 receives the electronic mail from the transfer source portability telephone 13 and sends the mail data of the electronic mail to the displaying and inputting section 45. Moreover, in the present embodiment, the electronic mail address of the transfer destination portability telephone 14, namely, the transfer destination mail address is set as "aaa@yyy.ne.jp".

The displaying and inputting section 45, for example, that is composed of a liquid crystal display and input button; has a function to display the transfer source notification scene for notifying of the transfer of the print authority from the transfer source portability telephone 13 on the basis of the mail data that received from the network interface section 44 and a function to input a getting demand of the job ID and the transfer source ID from the mail data. The inputted getting demand and the mail data are sent to the analyzing and getting section 46. In the FIG. 5, an example of the transfer source notification scene displayed in the displaying and inputting section 45 is represented.

Figure 5:
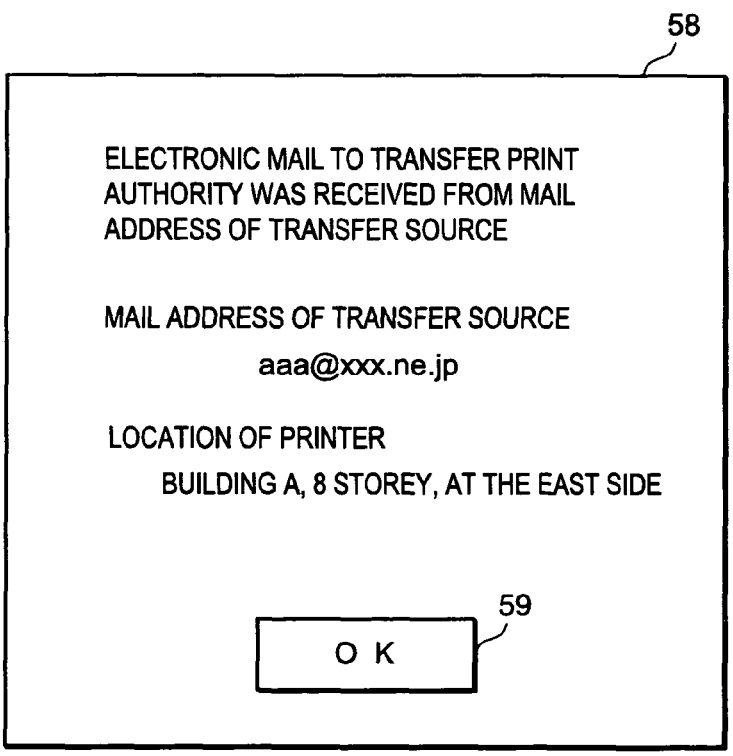
FIG. 5 is an explanatory diagram for showing a transfer destination notification scene.

FIG. 5 is an explanatory diagram for showing a transfer destination notification scene.

The transfer source notification scene 58, as shown by FIG. 5, displays the electronic mail address of the transfer source of the print authority, namely, the transfer source mail address "aaa@xxx.ne.jp" and the printer location information "building A, 8-storey, at the eastward" in order to notify that the print authority was transferred. Further, on the transfer source notification scene 58, "OK" button 59 is displayed.

In the transfer source notification scene 58 (FIG. 5), when the "OK" button 59 is selected, the displaying and inputting section 45 inputs the getting demand and sends it and the mail data to the analyzing and getting section 46.

The analyzing and getting section 46, when receives the getting demand and the mail data from the displaying and inputting section 45, analyzes the mail data and gets the job ID; the inherence ID serving as a transfer source ID of the transfer source portability telephone 13. The got job ID and the got transfer source ID are sent to the IC card section 47 and are stored into a transfer destination storing section 49 (mentioned below).

The IC card section 47 is an IC card function part in the transfer destination portability telephone 14, as shown by FIG. 1, includes an IC card communicating section 48, a transfer destination storing section 49 and a deleting section 50.

The IC card communicating section 48 has a function of wireless communication with the IC card reader writer 17, receives an electric source supply from the IC card reader writer 17 by non-contact, reads out the inherence ID, the job ID and the transfer source ID from the transfer destination storing section 49 and sends them to the IC card reader writer 17. Further, the IC card communicating section 48 sends the deletion instruction that is received from the IC card reader writer 17 to the deleting section 50. Furthermore, the IC card communicating section 48, when receives a notification of deletion end from the deleting section 50, notifies the printer 12 of the deletion end through the IC card reader writer 17.

The transfer destination storing section 49 is formed from IC chips that stores data in block unit indicating that one block is composed of 16 bytes, as shown by FIG. 1, has an inherence ID storing section 51, a job ID storing section 52 and a transfer source ID storing section 53.

The inherence ID storing section 51 is formed from a block that can read out but cannot write in, is a storing section for storing the inherence ID serving as terminal discrimination information that was assigned to the IC card section 47 of the transfer destination portability telephone 14. In the present embodiment, the inherence ID of the transfer destination portability telephone 14 stored in the inherence ID storing section 51, is "0123456789098765".

The job ID storing section 52 is formed from a block that can read out and write in and stores the job ID which is got and sent by the analyzing and getting section 46.

The transfer source ID storing section 53 is formed from a block that can read out and write in and stores the transfer source ID which is got and sent by the analyzing and getting section 46.

The deleting section 50 has a function to delete the stored data through writing the data "00000000000000000000" in the block of the transfer destination storing section 49; deletes the job ID from the job ID storing section 52 of the transfer destination storing section 49 and the transfer source ID from the transfer source ID storing section 53 respectively when getting the deletion instruction from the IC card communicating section 48. The deleting section 50 notifies the IC card communicating section 48 of a deletion end when the deletion ends.

Next, it is to explain about an operation of the printer system 10 of the present embodiment.

Figure 6:
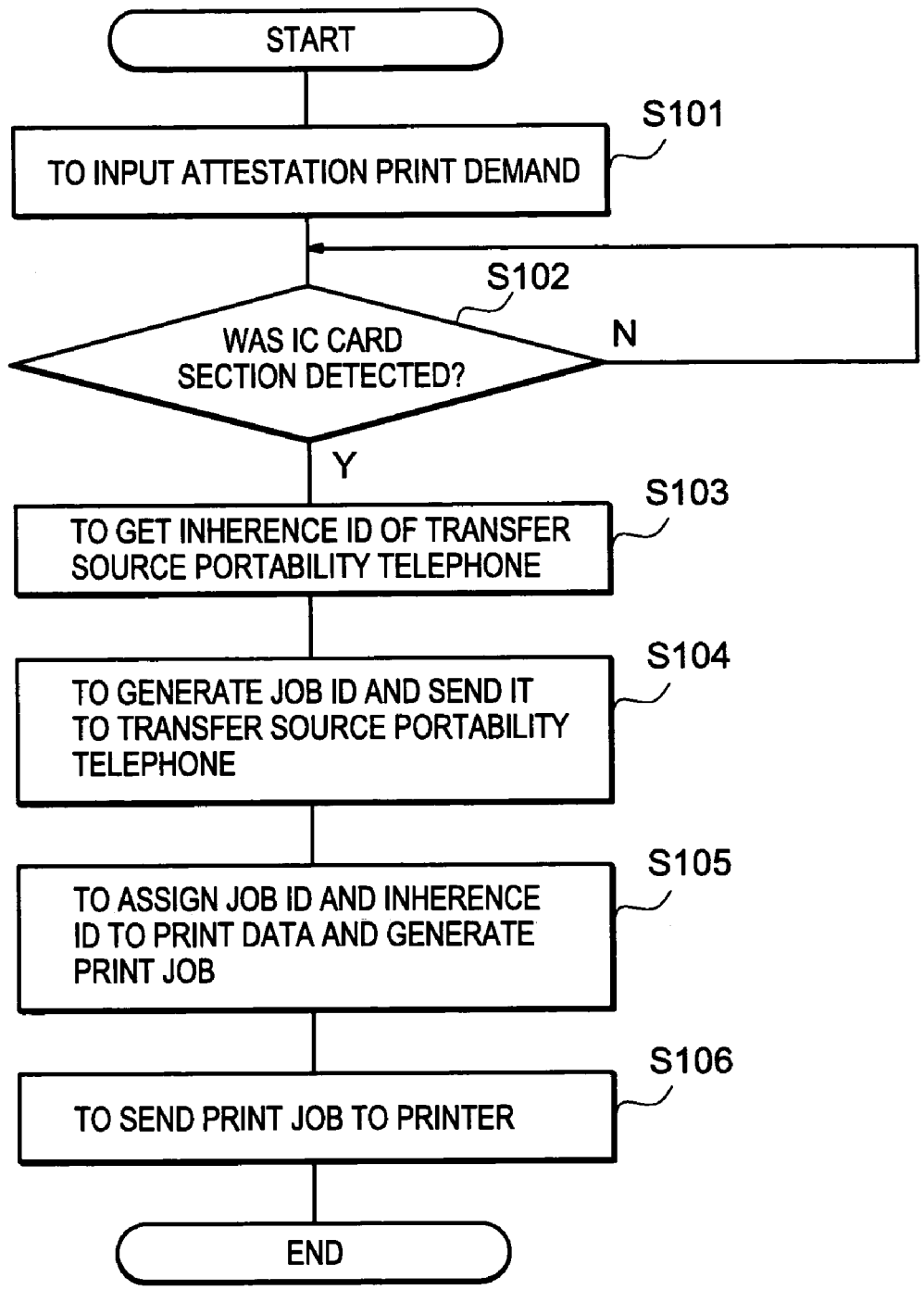
FIG. 6 is a flow chart for explaining print job generating and sending operation in host PC.

Firstly, in the host PC 11, it is to explain the case when the print job is generated and it is sent to the printer 12 according to a flow chart represented in FIG. 6.

FIG. 6 is a flow chart for explaining print job generating and sending operation in host PC.

In the host PC 11, when the inputting section 19 inputs the authentication print demand in the application section 20 (Step S101), the application section 20 sends the authentication print demand and the manuscript data to the printer driver 21.

The printer driver 21, when getting the authentication print demand and the manuscript data from the application section 20, sends a generation demand of the job ID and a getting demand of the inherence ID to the job ID generating section 22. The job ID generating section 22 transmits the received getting demand to the USB interface section 23.

The USB interface section 23 sets the IC card reader writer 16 in a stand-by state when receiving the getting demand of the inherence ID. Then, when the transfer source portability telephone 13 is approaching, the IC card reader writer 16 detects the IC card section 33 of the transfer source portability telephone 13 (Step S102).

Continuously, the IC card reader writer 16 performs a communication with the IC card communicating section 38 of the detecting IC card section 33. In the transfer source portability telephone 13, the IC card communicating section 38 reads out the inherence ID "0123456789abcdef" from the inherence ID storing section 41 of the transfer source storing section 39 and sends it to the IC card reader writer 16. Then, the IC card reader writer 16 receives and gets the inherence ID of the transfer source portability telephone 13 (Step S103). The got inherence ID is sent to the job ID generating section 22 through the USB interface section 23.

The job ID generating section 22, when receiving the inherence ID of the transfer source portability telephone 13, generates the job ID on the basis of the generation demand received from the printer driver 21 (Step S104). The job ID generating section 22, when generating the job ID "001a2b3c4d5e1234" including the MAC address of the host PC, sends the job ID to the IC card reader writer 16 through the USB interface section 23. Then, the IC card reader writer 16 sends the job ID to the transfer source portability telephone 13 (Step S104).

In the transfer source portability telephone 13, when the IC card communicating section 38 receives the job ID "001a2b3c4d5e1234" from the IC card reader writer 16, the job ID is written into the job ID storing section 42 of the transfer source storing section 39 for storing.

Continuously, the job ID generating section 22 sends the generated job ID and the got inherence ID to the printer driver 21. The printer driver 21, when receiving the job ID and the inherence ID, changes the manuscript data into a printer language and generates a print data, assigns the job ID and the inherence ID to the print data and generates a print job (Step S105). The generated print job is sent to the network interface section 24.

The network interface section 24, when receiving the print job, sends the print job to the printer 12 through the internet 15 (Step S106). By this, the print job generating and sending process in the host PC 11, is completed.

In the printer 12, when the network interface section 25 receives the print job from the host PC 11, the print job is sent to the job managing section 27. Then, the job managing section 27 issues the reception number concerning the print job and extracts the job ID, the inherence ID and the print job from the print job. Then, the job managing section 27 regards the inherence ID extracted as the registration ID, and sends the reception number, the registration ID, the job ID and the print data to the printer storing section 28. For example, the job managing section 27 issues the reception number "00000001", and sends it together with the registration ID "0123456789abcdef", the job ID "001a2b3c4d5e1234" and the print job "print job 1" to the printer storing section 28.

The printer storing section 28, when receiving the reception number, the registration ID, the job ID and the print data, makes the print data storing section 31 store the print data to correspond to the reception number and makes the list storing section 32 store the registration ID and the job ID to correspond to the reception number. In the print data storing section 31, as shown by FIG. 2, the print data "print data 1" is stored to correspond to the reception number "00000001", in the list storing section 32, as shown by FIG. 3, the registration ID "0123456789abcdef" and the job ID "001a2b3c4d5e1234" are stored to correspond to the reception number "00000001". By this, the print job receiving and storing process in the printer 12, is completed.

As stated above, in the host PC 11, when the job ID of the print job is generated; and the inherence ID of the transfer source portability telephone 13 is got, the print job including the job ID and the inherence ID is generated and it is sent to the printer 12. In the transfer source portability telephone 13, the job ID for the print time authentication is received from the host PC 11 and is stored.

Figure 7:
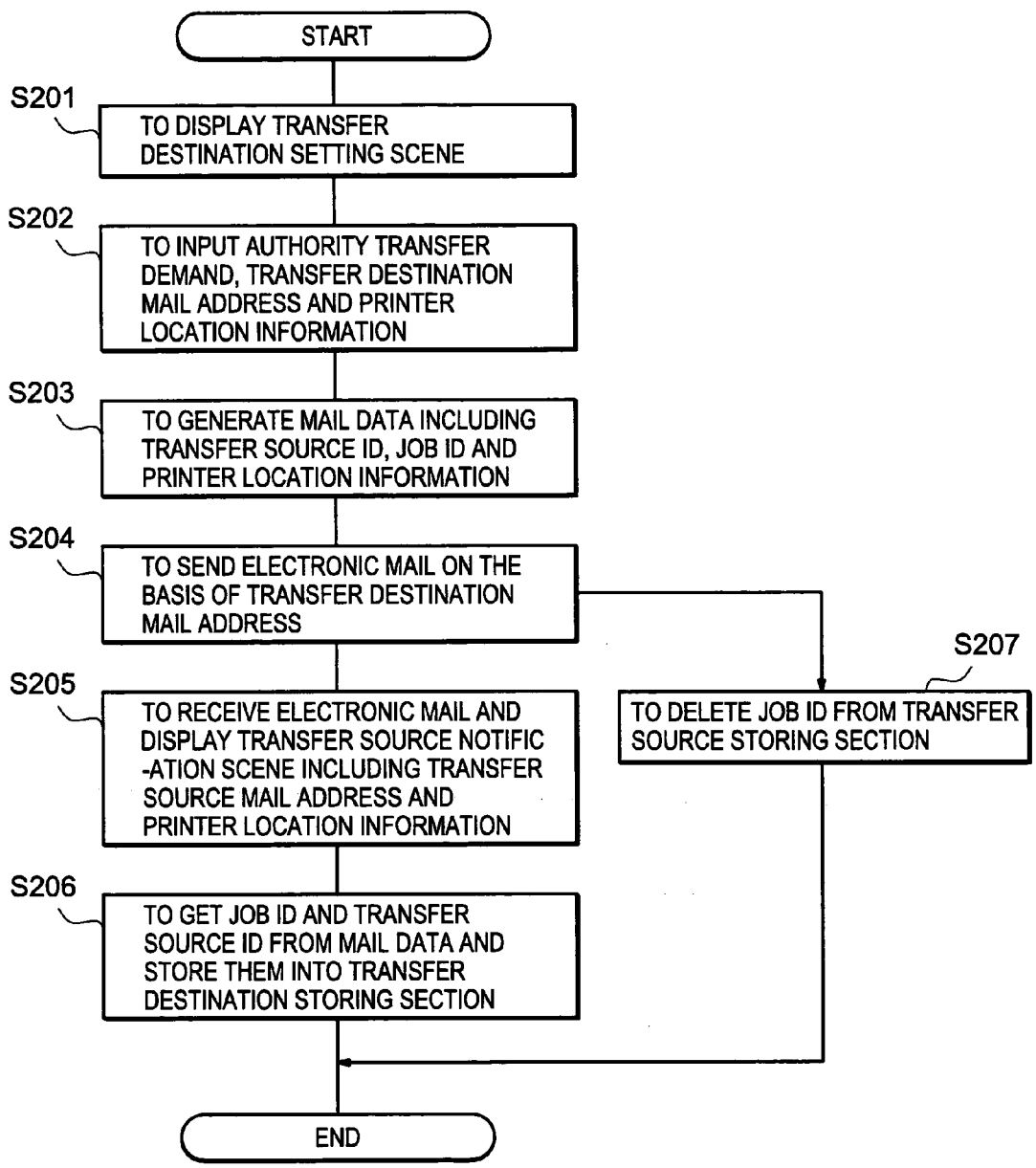
FIG. 7 is a flow chart for explaining a print authority transfer operation in embodiment 1 of a printer system of the present invention.

Next, it is to explain the case when the print authority is transferred from the transfer source portability telephone 13 to the transfer destination portability telephone 14 according to a flow chart represented in FIG. 7.

FIG. 7 is a flow chart for explaining a print authority transfer operation in embodiment 1 of a printer system of the present invention.

In the transfer source portability telephone 13, when the user operates the displaying and inputting section 34 and performs an input for transferring the print authority, the displaying and inputting section 34 reads out the scene information from the scene storing section 35 and displays the transfer destination setting scene (FIG. 4) (Step S201).

In the transfer destination setting scene 54 (FIG. 4), the user operates the displaying and inputting section 34; inputs the electronic mail address "bbb@yyy.ne.jp" of the transfer destination portability telephone 14 to the address input field 55 for appointing the transfer destination of the print authority; and inputs the printer location information "building A, 8-storey, at the eastward" to the location input field 56 for notifying the user of the transfer destination portability telephone 14. Then, when the "sending" button 57 is selected, the displaying and inputting section 34 inputs the authority transfer demand, the transfer destination mail address "bbb@yyy.ne.jp" and the printer location information "building A, 8-storey, at the eastward" (Step S202). The authority transfer demand, the transfer destination mail address and the printer location information that are inputted, are sent to the mail generating section 36.

The mail generating section 36, when receiving the authority transfer demand, the transfer destination mail address and the printer location information, generates the mail data for transferring the print authority to the transfer destination portability telephone 14. The mail generating section 36 reads out the inherence ID "0123456789abcdef" from the inherence ID storing section 41 of the transfer source storing section 39 and the job ID "001a2b3c4d5e1234" from the job ID storing section 42 respectively. Then, the mail generating section 36 generates mail data including the transfer source that serves as the read out inherence ID, the job ID and the printer location information (Step S203). The generated mail data is sent to the network interface section 37 together with the transfer destination mail address.

The network interface section 37, when receiving the mail data and the transfer destination mail address, sends the mail data by the electronic mail on the basis of the transfer destination mail address (Step S204).

In the transfer destination portability telephone 14, when the network interface section 44 receives the electronic mail from the transfer source portability telephone 13, the displaying and inputting section 45 displays the transfer source notification scene 58 (FIG. 5) including the transfer source mail address "aaa@xxx.ne.jp" and the printer location information "building A, 8-storey, at the eastward" (Step S205).

In the transfer source notification scene 58 (FIG. 5), when the "OK" button 59 is selected, the displaying and inputting section 45 inputs the getting demand of the job ID and transfer source ID and sends the getting demand and the mail data to the analyzing and getting section 46. Then, the analyzing and getting section 46 analyzes the mail data on the basis of the getting demand and gets the job ID and the transfer source ID (Step S206). The job ID and the transfer source ID are sent to the transfer destination storing section 49 of the IC card section 47 and are stored into the job ID storing section 52 and the transfer source ID storing section 53 respectively (Step S206).

In the transfer source portability telephone 13, the network interface section 37, after sent the electronic mail (Step S204), sends the deletion instruction of the job ID to the deleting section 40 of the IC card section 33. The deleting section 40 receives the deletion instruction and deletes the job ID "001a2b3c4d5e1234" from the job ID storing section 42 of the transfer source storing section 39 (Step S207). By this, the transfer process of the print authority is completed.

As stated above, the print authority is transferred from the transfer source portability telephone 13 to the transfer destination portability telephone 14.

Figure 8:
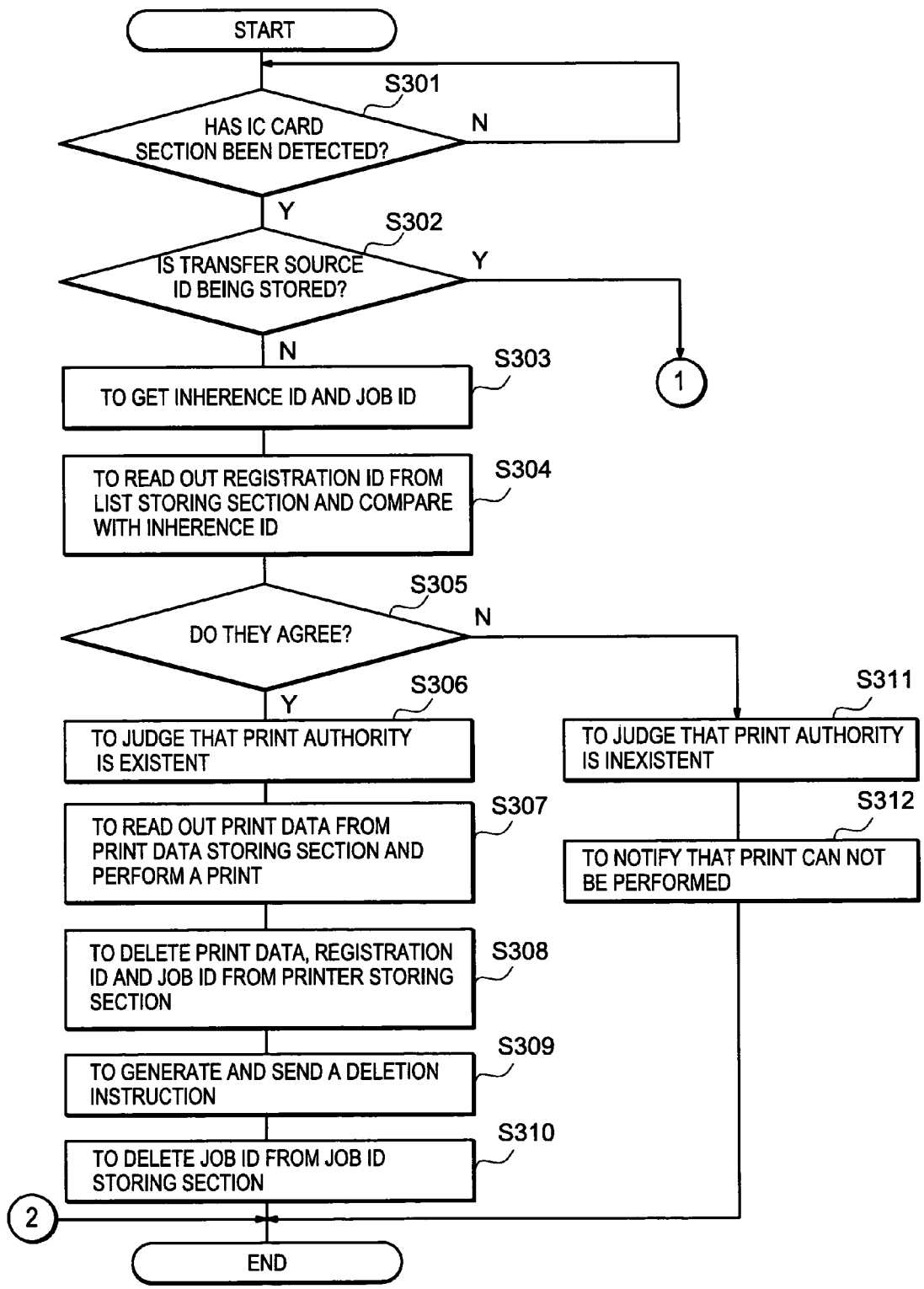
FIG. 8 is a first flow chart for explaining an authentication print operation in embodiment 1 of a printer system of the present invention.
Figure 9:
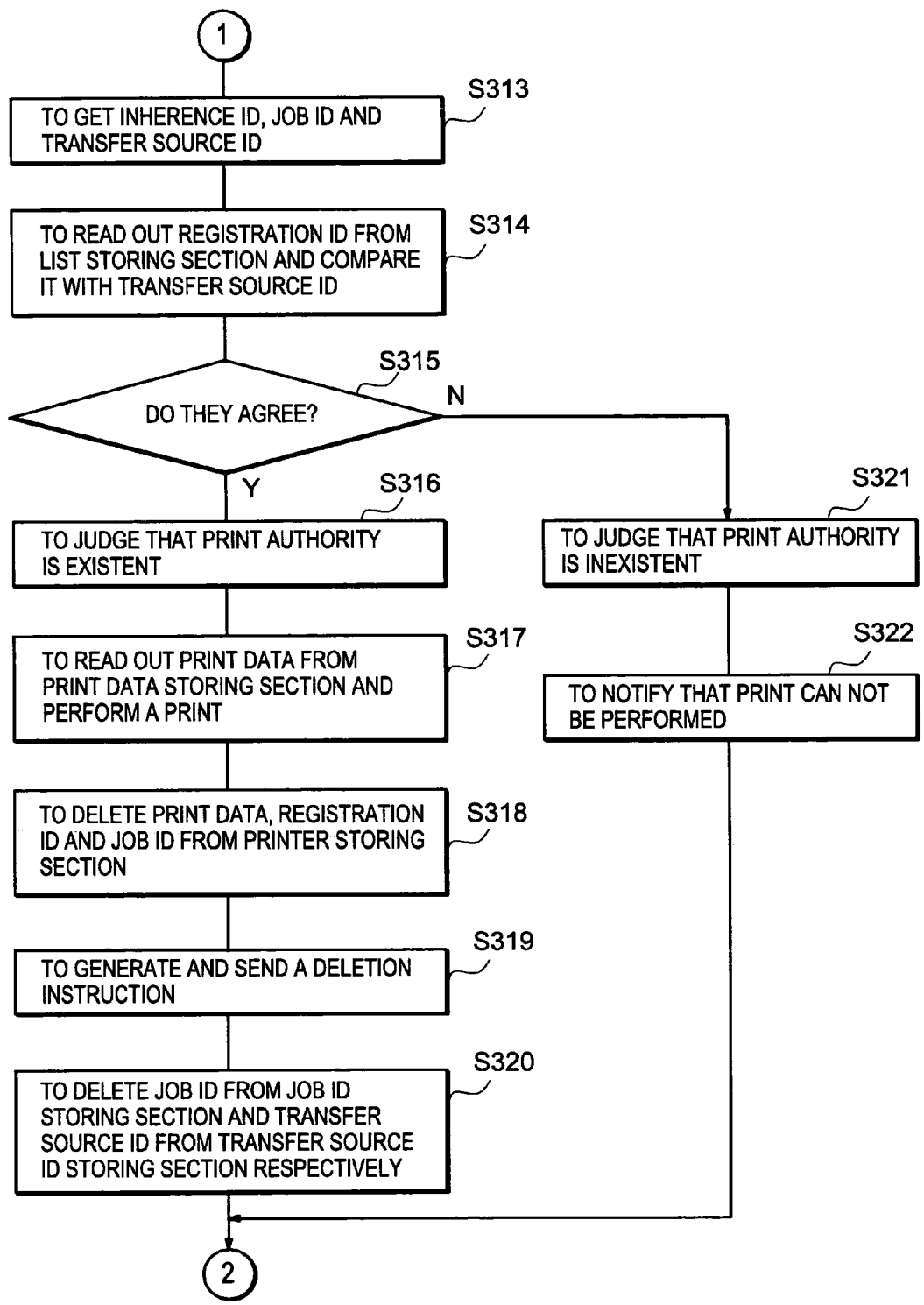
FIG. 9 is a second flow chart for explaining an authentication print operation in embodiment 1 of a printer system of the present invention.

Next, in the printer 12, it is to explain the case of an authentication print process that performs an authentication process and a print process according to a flow chart represented in FIG. 8 and FIG. 9.

FIG. 8 is a first flow chart for explaining an authentication print operation in embodiment 1 of a printer system of the present invention; FIG. 9 is a second flow chart for explaining an authentication print operation in embodiment 1 of a printer system of the present invention.

Firstly, it is to explain the case that the transfer source portability telephone 13 does not transfer the print authority, but the authentication print is executed in the printer 12 according to the FIG. 8.

The user of the transfer source portability telephone 13 possesses the transfer source portability telephone 13 and goes to a setting place of the printer 12 to make the transfer source portability telephone 13 touch with the IC card reader writer 17 connected to the printer 12.

The IC card reader writer 17, when detecting the IC card section 33 of the transfer source portability telephone 13 (Step S301), performs a communication with the IC card communicating section 38 of the detected IC card section 33.

In the transfer source portability telephone 13, the IC card communicating section 38 of the IC card section 33 reads out each data that has been stored from each block of the transfer source storing section 39 and sends them to the IC card reader writer 17. Here, because the transfer source ID is not stored in the transfer source ID storing section 43 of the transfer source storing section 39 (Step S302), the IC card communicating section 38 reads out the inherence ID "0123456789abcdef" from the inherence ID storing section 41 and the job ID "001a2b3c4d5e1234" from the job ID storing section 42 respectively, and sends them to the IC card reader writer 17. Then, the IC card reader writer 17 receives and gets the inherence ID and the job ID (Step S303). The got inherence ID and the got job ID are sent to the job managing section 27 through the USB interface section 26.

The job managing section 27, when receiving the inherence ID and the job ID from the USB interface section 26, sends the inherence ID and the job ID to the judging section 29 for judging whether or not the print authority of the transfer source portability telephone 13 is existent. The judging section 29 searches the list storing section 32 (FIG. 3) on the basis of the received job ID "001a2b3c4d5e1234" and reads out the corresponding registration ID "0123456789abcdef" that is being stored (Step S304). Then, the judging section 29 compares the read registration ID with the inherence ID "0123456789abcdef" received from the job managing section 27 (Step S304).

When the registration ID agrees with the inherence ID (Step S305), the judging section 29 judges that the print authority of the transfer source portability telephone 13 is existent (Step S306).

When judging that the print authority is existent (Step S306), the judging section 29 reads out the reception number "00000001" corresponding to the registration ID "0123456789abcdef" and the job ID "001a2b3c4d5e1234" from the list storing section 32 (FIG. 3) and notifies the job managing section 27 of the judgment result and the reception number.

The job managing section 27, when notified that the print authority is existent, sends the print instruction and the reception number "00000001" to the printing section 30 for releasing the print limitation concerning the print job of the reception number "00000001". The printing section 30, after received the print instruction, reads out the print data "print data 1" corresponding to the reception number "00000001" from the print data storing section 31 (FIG. 2), performs a print onto the record medium on the basis of the print data (Step S307). When the print is completed, the printing section 30 notifies the job managing section 27 of the print completion and the reception number "00000001".

The job managing section 27, when notified of the print completion and the reception number, deletes each data that has been stored in the printer storing section 28 and corresponds to the reception number. That is, the reception number "00000001" and the print data "print data 1" are deleted from the print data storing section 31 (FIG. 2); the reception number "00000001", the registration ID "0123456789abcdef" and the job ID "001a2b3c4d5e1234" are deleted from the list storing section 32 (FIG. 3) (Step S308).

Continuously, the job managing section 27 generates the deletion instruction of the job ID concerning the transfer source portability telephone 13 and sends the deletion instruction to the USB interface section 26. Then, the IC card reader writer 17 sends the deletion instruction to the transfer source portability telephone 13 (Step S309).

In the transfer source portability telephone 13, when the IC card communicating section 38 of the IC card section 33 receives the deletion instruction from the IC card reader writer 17, the IC card communicating section 38 sends the deletion instruction to the deleting section 40. Then, the deleting section 40 overwrites the data "0000000000000000" into the job ID storing section 42 of the transfer source storing section 39 and deletes the stored job ID "001a2b3c4d5e1234" (Step S310). By this, the authentication print process in the printer system 10, is completed.

As stated above, the print time authentication is executed on the basis of the inherence ID got from portability telephone.

Moreover, in the Step S305, when the registration ID disagrees with the inherence ID, the judging section 29 judges that the print authority of the transfer source portability telephone 13 is inexistent (Step S311) and notifies the job managing section 27 of the judgment result. The job managing section 27, after received the judgment result, makes a displaying section (not shown) display a message notifying that the print cannot perform (Step S312). By this, the authentication print process in the printer system 10, is completed.

Next, it is to explain the case that the transfer destination portability telephone 14 which is transferred the print authority from the transfer source portability telephone 13, makes the printer 12 execute the authentication print according to the FIG. 8 and the FIG. 9.

The user of the transfer destination portability telephone 14 possesses the transfer destination portability telephone 14 and goes to the setting place of the printer 12 to make the transfer destination portability telephone 14 touch with the IC card reader writer 17 connected to the printer 12.

The IC card reader writer 17, when detecting the IC card section 47 of the transfer destination portability telephone 14 (Step S301), performs a communication with the IC card communicating section 48 of the IC card section 47.

In the transfer destination portability telephone 14, because the transfer source ID is stored in the transfer source ID storing section 53 of the transfer destination storing section 49 (Step S302), the IC card communicating section 48 reads out the inherence ID "0123456789098765" from the inherence ID storing section 51, the job ID "001a2b3c4d5e1234" from the job ID storing section 52 and the transfer source ID "0123456789abcdef" from the transfer source ID storing section 53 respectively, and sends them to the IC card reader writer 17. Then, the IC card reader writer 17 receives and gets the inherence ID, the job ID and the transfer source ID (Step S313). The got inherence ID, the got job ID and the got transfer source ID are sent to the job managing section 27 through the USB interface section 26.

The job managing section 27, when receiving the inherence ID, the job ID and the transfer source ID from the USB interface section 26, sends the job ID and the transfer source ID to the judging section 29 for judging whether or not the print authority of the transfer destination portability telephone 14 is existent. The judging section 29 searches the list storing section 32 (FIG. 3) on the basis of the received job ID "001a2b3c4d5e1234", reads out the registration ID "0123456789abcdef" that is correspondingly stored and compares the registration ID with the transfer source ID "0123456789abcdef" received from the job managing section 27 (Step S314).

When the registration ID agrees with the transfer source ID (Step S315), the judging section 29 judges that the print authority of the transfer destination portability telephone 14 is existent (Step S316).

When judging that the print authority is existent (Step S316), the judging section 29 reads out the reception number "0000001" corresponding to the registration ID "0123456789abcdef" and the job ID "001a2b3c4d5e1234" from the list storing section 32 (FIG. 3) and notifies the job managing section 27 of the judgment result and the reception number.

The job managing section 27, after received the notification that the print authority is existent, sends the print instruction and the reception number "00000001" to the printing section 30 for releasing the print limitation concerning the print job of the reception number "00000001". The printing section 30, after received the print instruction and the reception number, reads out the corresponding print data "print data 1" from the print data storing section 31 (FIG. 2) and performs a print onto the record medium (Step S317). When the print is completed, the printing section 30 notifies the job managing section 27 of the print completion and the reception number "00000001".

The job managing section 27 gets the notification of the print completion and the reception number and deletes each data corresponding to the reception number from the printer storing section 28 (Step S318). That is, the reception number "00000001" and the print data "print data 1" are deleted from the print data storing section 31 (FIG. 2); the reception number "00000001", the registration ID "0123456789abcdef" and the job ID "001a2b3c4d5e1234" are deleted from the list storing section 32 (FIG. 3) (Step S318).

Continuously, the job managing section 27 generates the deletion instruction of the job ID and the transfer source ID concerning the transfer destination portability telephone 14 and sends the deletion instruction to the USB interface section 26. Then, the IC card reader writer 17 sends the deletion instruction to the transfer destination portability telephone 14 (Step S319).

In the transfer destination portability telephone 14, when the IC card communicating section 48 of the IC card section 47 receives the deletion instruction from the IC card reader writer 17, the IC card communicating section 48 sends the deletion instruction to the deleting section 50. Then, the deleting section 50 overwrites the data "0000000000000000" into the job ID storing section 52 and the transfer source ID storing section 53 of the transfer destination storing section 49 respectively and deletes the stored job ID "001a2b3c4d5e1234" and the stored transfer source ID "0123456789abcdef" (Step S320). By this, the authentication print process in the printer system 10, is completed.

As stated above, the print time authentication is executed through getting the transfer source ID serving as authority information from portability telephone being transferred the print authority.

Moreover, in the Step S315, when the registration ID disagrees with the transfer source ID, the judging section 29 judges that the print authority of the transfer destination portability telephone 14 is inexistent (Step S321) and notifies the job managing section 27 of the judgment result. The job managing section 27, after received the judgment result, makes a displaying section (not shown) display a message notifying that the print cannot perform (Step S322). By this, the authentication print process in the printer system 10, is completed.

Further, after the authentication print is executed, the printer 12 can also be notified of the deletion completion from the transfer destination portability telephone 14 for certainly deleting the print authority of the transfer source portability telephone 13 being transferred to the transfer destination portability telephone 14, namely, the transfer source ID. In the case, when the printer 12 is not notified of the deletion completion although a predetermined time is passed, the printer 12 may store the inherence ID "012345678909875" of the transfer destination portability telephone 14, which is got in the Step S313 in order not to permit the authentication print using the transfer destination portability telephone 14.

As stated above, in the present embodiment, through sending the inherence ID and the job ID of the print job to other portability telephone appended the IC card function by using the electronic mail function of the portability telephone appended IC card function, it is possible to transfer the print authority which is held by the portability telephone of the sending source to the portability telephone of the sending destination. Therefore, after the user of the portability telephone holding the print authority made the print job be sent to the printer being far away from the host computer, even if he/she cannot go to the setting place of the printer and cannot use the host computer, because he/she can transfer the print authority to other user, so the convenience is improved. Further, because an authentication print in the printer can be executed through transferring only the print authority without sending print data to other host computer, so the security is held.

Embodiment 2

Figure 10:
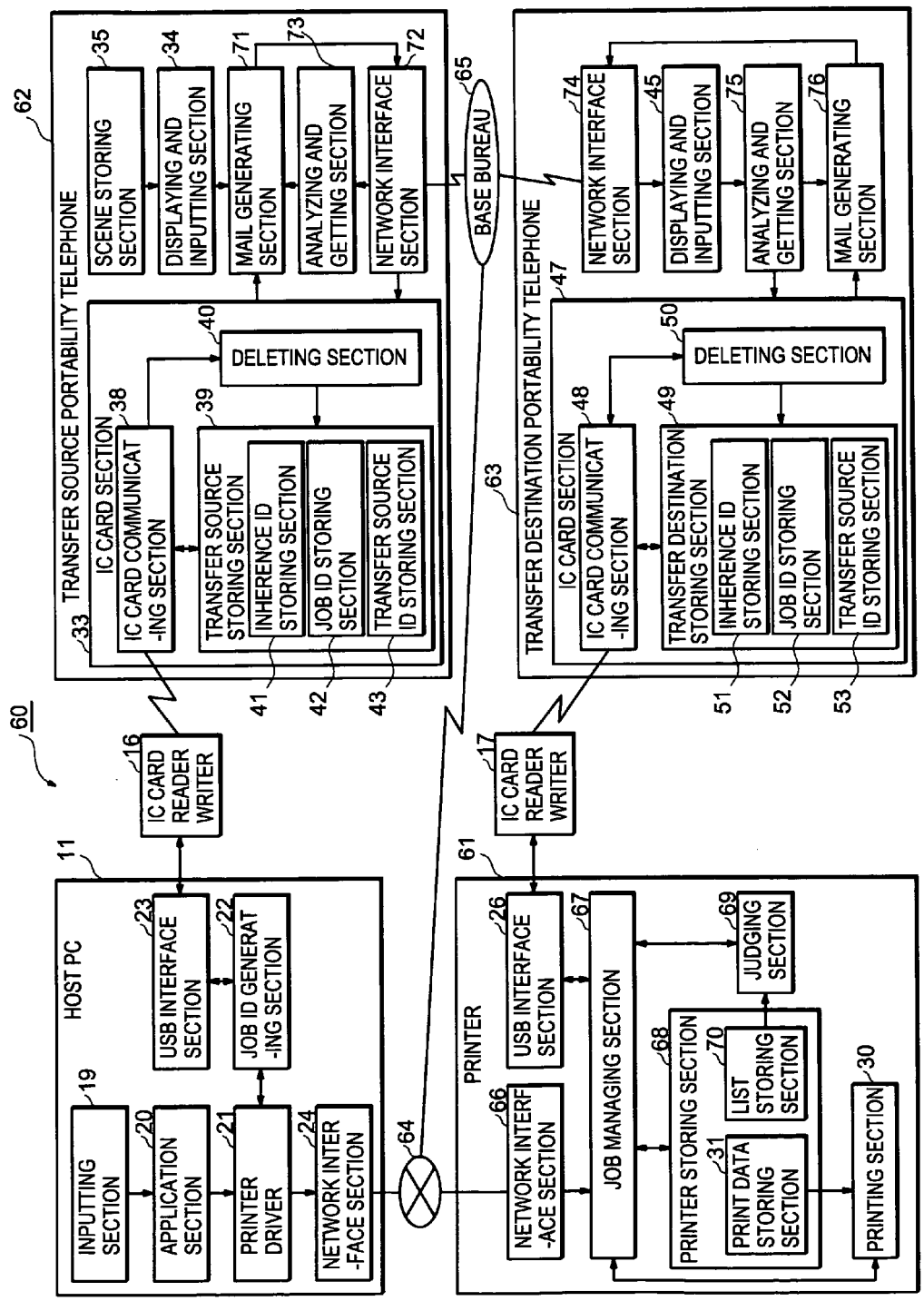
FIG. 10 is a block diagram for showing a structure of a printer system in embodiment 2 of the present invention.

FIG. 10 is a block diagram for showing a structure of a printer system in embodiment 2 of the present invention.

In the printer system 60 of the present embodiment, a structure that a transfer source portability telephone 62 can communicate with a printer 61 via base bureau 65 and internet 64, is different from the embodiment 1.

Moreover, in the present embodiment, the same components as that in the embodiment 1 are represented by the same symbols and these detailed explanations are omitted.

The printer system 60, as shown by FIG. 10, includes a host PC 11, a printer 61, a transfer source portability telephone 62 and a transfer destination portability telephone 63.

The printer 61, as an information processing apparatus, as shown by FIG. 10, includes a network interface section 66, a USB interface section 26, a job managing section 67, a printer storing section 68, a judging section 69 and a printing section 30.

The network interface section 66 receives a print job from the host PC 11 through the internet 64 and sends it to the job managing section 67. Further, the network interface section 66, as a first receiving section, receives an electronic mail serving as transfer end information from the transfer source portability telephone 62 through the internet 64 and the base bureau 65 and sends it to the job managing section 67.

The job managing section 67 has a function to manage the print job, concerning the print job received from the network interface section 66, issues a reception number and extracts a inherence ID, a job ID and print data from the print job. Then, the job managing section 67, regarding the extracted inherence ID as a registration ID, sends the issued reception number, the registration ID, the job ID and print data to the printer storing section 68 for storing.

Further, the job managing section 67 analyzes the mail data received from the network interface section 66 and has a analysis getting function to get a transfer source ID, the job ID and a transfer destination ID. The job managing section 67 sends the got transfer source ID and job ID to the judging section 69. Then, the job managing section 67, when notified of a judgment result that the transfer source ID agrees with the registration ID and the reception number from the judging section 69, sends the reception number and the transfer destination ID which is got from the electronic mail to the printer storing section 68.

The printer storing section 68, as an apparatus storing section, has a print data storing section 31 and a list storing section 70.

The list storing section 70 correspondingly stores the reception number, the registration ID and the job ID that are received from the job managing section 67. Further, the list storing section 70 correspondingly stores the reception number and the transfer destination ID that are received from the job managing section 67.

FIG. 11 is an explanatory diagram for showing a structure of a list storing section in embodiment 2.

In the list storing section 70, as shown by FIG. 11, the registration ID and the job ID are stored corresponding to the reception number. Further, in the list storing section 70, a transfer destination ID item is set up, when the job ID and the transfer destination ID are received from the job managing section 67, the received transfer destination ID is stored into the transfer destination ID item corresponding to the received job ID.

In the FIG. 11, on the one hand, in the list storing section 70, for example, corresponding to the reception number "00000001", the registration ID "0123456789abcdef" and the job ID "001a2b3c4d5e1234", furthermore the transfer destination ID "0123456789098765" are stored. On the other hand, the registration ID "0123456789abcdef" and the job ID "001a2b3c4d5e1235" that correspond to the reception number "00000002" are stored, but the transfer destination ID is not stored. That is, the print authority of the print job corresponding to the reception number "00000001" had been transferred to the transfer destination portability telephone 63 from the transfer source portability telephone 62, but the print authority of the print job corresponding to the reception number "00000002" is not transferred.

The judging section 69, when receiving the inherence ID, the job ID and the transfer source ID through the job managing section 67, judges whether or not the print authority of the transfer destination portability telephone 63 is existent. That is, the judging section 69 searches the list storing section 70 on the basis of the job ID received from the job managing section 67 and reads out the registration ID and the transfer destination ID that have been correspondingly stored. Then, the judging section 69 compares the read registration ID with the received transfer source ID, and compares the read transfer destination ID with the received inherence ID and respectively judges whether or not they agree. When judging they all agree, the judging section 69 judges that the transfer destination portability telephone 63 has the print authority; reads out the corresponding reception number from the list storing section 70; and notifies the job managing section 67 of the judgment result and the reception number. When judging which of them disagrees, the judging section 69 judges that the transfer destination portability telephone 63 does not have the print authority and notifies the job managing section 67 of the judgment result.

Further, the judging section 69, when receiving the transfer source ID and the job ID from the job managing section 67, searches the list storing section 70 on the basis of the received job ID and reads out the corresponding registration ID that has been stored. Then, the judging section 69 compares the read registration ID with the received transfer source ID and judges whether or not the registration ID agrees with the transfer source ID. When judging that they agree, the judging section 69 reads out the corresponding reception number from the list storing section 70 and notifies the job managing section 67 of the judgment result and the reception number. When judging that they disagree, the judging section 69 notifies the job managing section 67 of the judgment result.

The transfer source portability telephone 62 is formed from a portability telephone that has an IC card function, as shown by FIG. 10, includes an IC card section 33, a displaying and inputting section 34, a scene storing section 35, an mail generating section 71, a network interface section 72 and an analyzing and getting section 73.

The mail generating section 71, when the authority transfer demand, the transfer destination mail address and the printer location information are inputted, generates a mail data for transferring the print authority to the transfer destination portability telephone 63. The generated mail data and the inputted transfer destination mail address are sent to the network interface section 72. Moreover, in the present embodiment, the electronic mail address of the transfer source portability telephone 62, namely, the transfer source mail address is set as "aaa@xxx.ne.jp".

Further, the mail generating section 71, when receiving the transfer destination ID from the analyzing and getting section 73, generates the mail data for notifying the printer 61 that the transfer of the print authority is ended. In the mail data that is generated by the mail generating section 71, the inherence ID of the transfer source portability telephone 62 is included as the transfer source ID; the inherence ID of the transfer destination portability telephone 63 is included as the transfer destination ID; and the job ID of the print job that the transfer of the print authority is ended, is also included. The generated mail data and the electronic mail address of the printer 61 that has been stored previously, namely, the printer mail address are sent to the network interface section 72.

The network interface section 72, as a transfer source sending section, has a function to perform a communication by the electronic mail with the transfer destination portability telephone 63 through the base bureau 65. The network interface section 72, when receiving the mail data and the transfer destination mail address from the mail generating section 71, sends the mail data by the electronic mail on the basis of the transfer destination mail address. Further, the network interface section 72, when receiving the electronic mail from the transfer destination portability telephone 63, sends mail data of the electronic mail to the analyzing and getting section 73.

Furthermore, the network interface section 72 has a function to perform a communication by electronic mail with the printer 61 through the base bureau 65 and the internet 64. The network interface section 72, when receiving the mail data and the printer mail address from the mail generating section 71, sends the mail data by the electronic mail on the basis of the printer mail address.

The analyzing and getting section 73, when receiving the mail data from the network interface section 72, analyzes the mail data and gets the inherence ID of the transfer destination portability telephone 63 as the transfer destination ID. The got transfer destination ID is sent to the mail generating section 71.

The transfer destination portability telephone 63 is formed from a portability telephone having an IC card function, as shown by FIG. 10, includes an network interface section 74, a displaying and inputting section 45, an analyzing and getting section 75, a mail generating section 76 and an IC card section 47.

The network interface section 74, as a transfer destination receiving section, has a function to perform a communication by the electronic mail with the transfer source portability telephone 62 through the base bureau 65. The network interface section 74 receives the electronic mail from the transfer source portability telephone 62 and sends mail data of the electronic mail to the displaying and inputting section 45. Moreover, in the present embodiment, the electronic mail address of the transfer destination portability telephone 63, namely, the transfer destination mail address is set as "bbb@yyy.ne.jp".

Further, the network interface section 74 receives the mail data and the transfer source mail address, and sends the mail data by the electronic mail on the basis of the transfer source mail address.

The analyzing and getting section 75 receives the getting demand and the mail data from the displaying and inputting section 45, performs an analysis of the mail data and gets the transfer source mail address, the job ID and the transfer source ID from the mail data. Then, the analyzing and getting section 75 sends the got job ID and the got transfer source ID to the IC card section 47, make the transfer destination storing section 49 store them, and sends the got transfer source mail address and a generation demand of the mail data to the mail generating section 76.

The mail generating section 76, when receiving the generation demand and the transfer source mail address from the analyzing and getting section 75, reads out the inherence ID "0123456789098765" of the transfer destination portability telephone 63, that is stored in the inherence ID storing section 51 from the transfer destination storing section 49 of the IC card section 47. Then, this inherence ID is regarded as the transfer destination ID, mail data including the transfer destination ID is generated. The generated mail data and the received transfer source mail address are sent to the network interface section 74.

Next, it is to explain about an operation of the printer system 60 of the present embodiment.

In the host PC 11, because the flow to generate print job and to send it to the printer 61 is the same as that of the embodiment 1 (FIG. 6), so its explanation is omitted.

Figure 12:
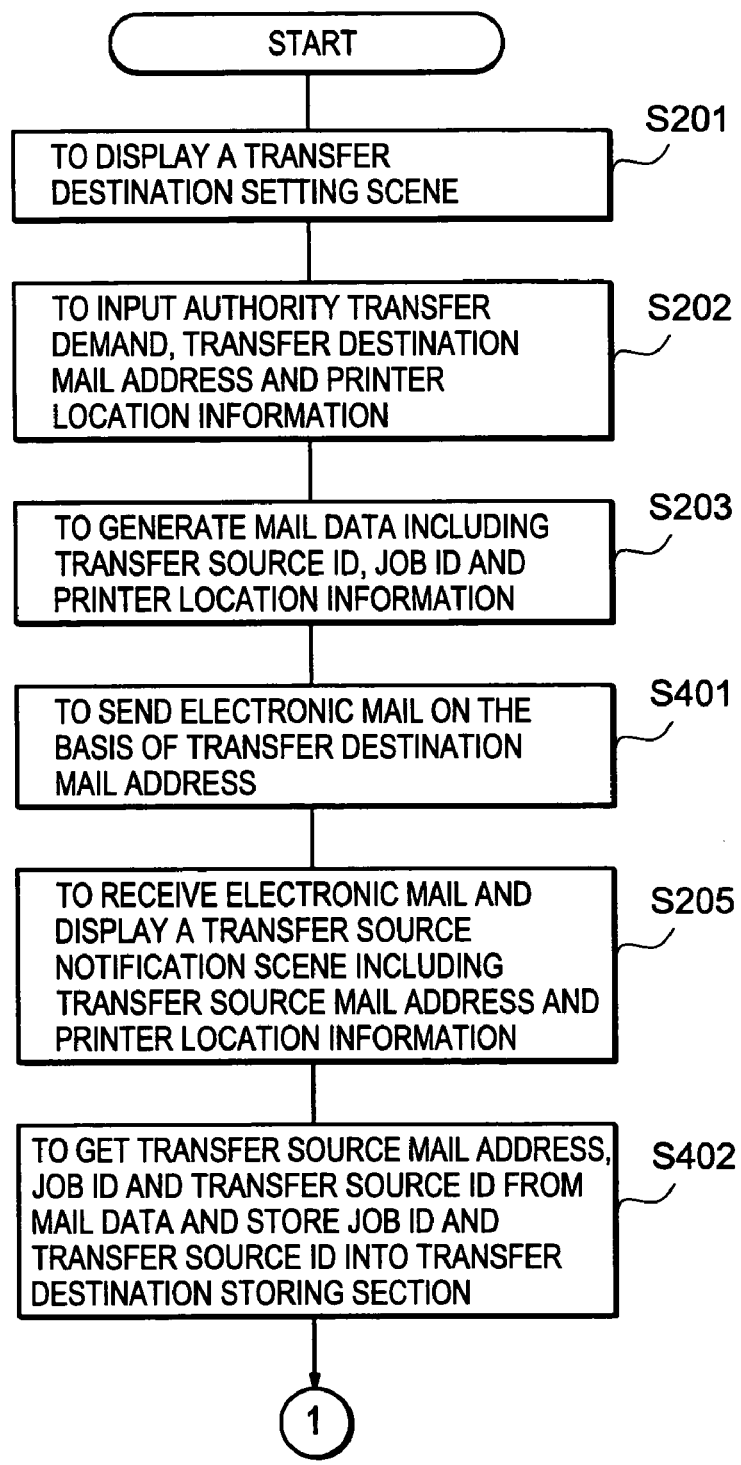
FIG. 12 is a first flow chart for explaining a print authority transfer operation in embodiment 2 of a printer system of the present invention.
Figure 13:
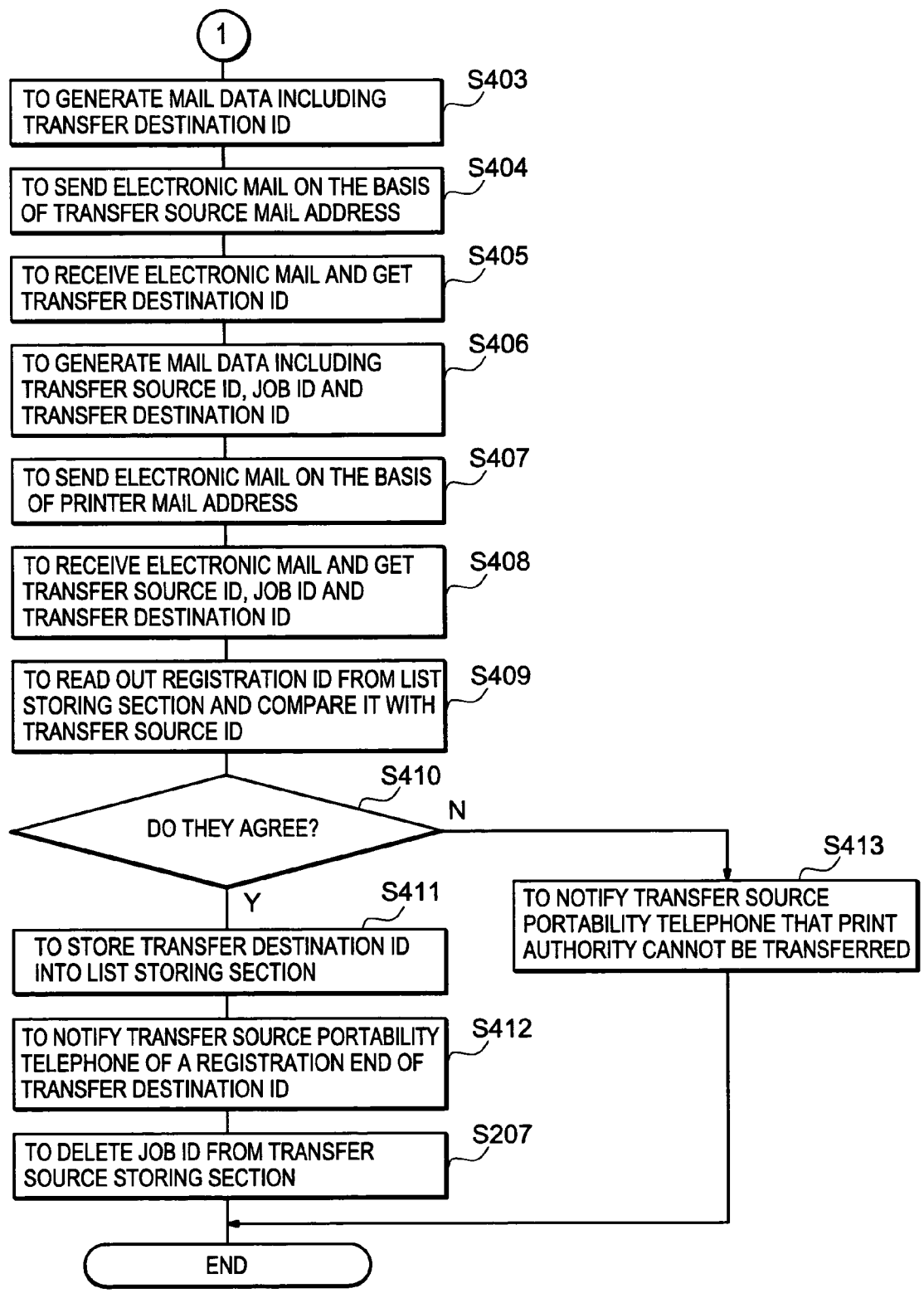
FIG. 13 is a second flow chart for explaining a print authority transfer operation in embodiment 2 of a printer system of the present invention.

Here, firstly, it is to explain the case that the print authority is transferred to the transfer destination portability telephone 63 from the transfer source portability telephone 62 according to a flow chart represented in FIG. 12 and FIG. 13.

FIG. 12 is a first flow chart for explaining a print authority transfer operation in embodiment 2 of a printer system of the present invention; FIG. 13 is a second flow chart for explaining a print authority transfer operation in embodiment 2 of a printer system of the present invention.

In the transfer source portability telephone 62, after the displaying and inputting section 34 displayed the transfer destination setting scene 54 (FIG. 4) (Step S201), the user of the transfer source portability telephone 62 operates the displaying and inputting section 34 and to input the transfer destination mail address "bbb@yyy.ne.jp" to the address input field 55 of the transfer destination setting scene 54 and to input the printer location information "building A, 8-storey, at the eastward" to the location input field 56. When the user selected the "sending" button 57, the displaying and inputting section 34 inputs the authority transfer demand, the transfer destination mail address and the printer location information (Step S202). The authority transfer demand, the transfer destination mail address and the printer location information that were inputted, are sent to the mail generating section 71.

The mail generating section 71, when receiving the authority transfer demand, the transfer destination mail address and the printer location information, reads out the inherence ID "0123456789abcdef" from the inherence ID storing section 41 of the transfer source storing section 39 and the job ID "001a2b3c4d5e1234" from the job ID storing section 42 respectively, regards the read out inherence ID as the transfer source ID, generates the mail data including the transfer source ID, the job ID and the printer location information (Step S203). The generated mail data and the transfer destination mail address are sent to the network interface section 72.

The network interface section 72, when receiving the mail data and the transfer destination mail address, sends the mail data by the electronic mail on the basis of the transfer destination mail address (Step S401).

In the transfer destination portability telephone 63, when the network interface section 74 receives the electronic mail from the transfer source portability telephone 62, the displaying and inputting section 45 displays the transfer source notification scene (FIG. 5) including the transfer source mail address "aaa@xxx.ne.jp" and the printer location information "building A, 8-storey, at the eastward" (Step S205).

In the transfer source notification scene 58 (FIG. 5), when "OK" button 59 is selected, the displaying and inputting section 45 inputs the getting demand and sends it to the analyzing and getting section 75 together with the mail data. Then, the analyzing and getting section 75 analyzes the mail data on the basis of the getting demand and gets the transfer source mail address, the job ID and the transfer source ID (Step S402). The job ID and the transfer source ID that were got, are sent to the transfer destination storing section 49 of the IC card section 47 and are correspondingly stored into the job ID storing section 52 and the transfer source ID storing section 53 (Step S402). Further, the got transfer source ID and the generation demand of the mail data are sent to the mail generating section 76 from the analyzing and getting section 75.

The mail generating section 76, when receiving the generation demand and the transfer source mail address, reads out the inherence ID "0123456789098765" from the inherence ID storing section 51 of the transfer destination storing section 49, regards the inherence ID as the transfer destination ID, and generates the mail data including the transfer destination ID (Step S403). The generated mail data and the transfer source mail address are sent to the network interface section 74.

The network interface section 74, when receiving the mail data and the transfer source mail address, sends the mail data by the electronic mail on the basis of the transfer source mail address (Step S404).

In the transfer source portability telephone 62, when the network interface section 72 receives the electronic mail from the transfer destination portability telephone 63 (Step S405), the mail data of the electronic mail is sent to the analyzing and getting section 73. Then, the analyzing and getting section 73 analyzes the mail data, gets the transfer destination ID and sends it to the mail generating section 71 (Step S405).

The mail generating section 71, when receiving the transfer destination ID, generates the mail data including the transfer destination ID serving as the transfer end information for notifying the printer 61 that the transfer of the print authority is ended (Step S406). The mail generating section 71 regards the inherence ID "0123456789abcdef" of the transfer source portability telephone 62 as the transfer source ID and generates the mail data including the transfer source ID, the job ID "001a2b3c4d5e1234" and the transfer destination ID "0123456789098765" (Step S406). The generated mail data and the printer mail address are sent to the network interface section 72.

The network interface section 72, when receiving the mail data and the printer mail address, sends the mail data by the electronic mail on the basis of the printer mail address (Step S407).

In the printer 61, when the network interface section 66 receives the electronic mail from the transfer source portability telephone 62 (Step S408), the mail data of the electronic mail is sent to the job managing section 67. Then, the job managing section 67 analyzes the mail data and gets the transfer source ID "0123456789abcdef", the job ID "001a2b3c4d5e1234" and the transfer destination ID "0123456789098765" (Step S408). The job managing section 67 sends the transfer source ID and the job ID that were got to the judging section 69.

The judging section 69, when receiving the transfer source ID and the job ID from the job managing section 67, searches the list storing section 70 (FIG. 11) on the basis of the job ID "001a2b3c4d5e1234", reads out the registration ID "0123456789abcdef" which is correspondingly stored and compares the registration ID with the transfer source ID "0123456789abcdef" (Step S409).

The judging section 69 judges whether or not the registration ID agrees with the transfer source ID on the basis of the comparison result (Step S410). When judged they agree (Step S410), the judging section 69 reads out the reception number "00000001" corresponding to the registration ID "0123456789abcdef" and the job ID "001a2b3c4d5e1234" from the list storing section 70 (FIG. 11) and notifies the job managing section 67 of the judgment result and the reception number.

The job managing section 67, when notified that they agree, sends the reception number "00000001" and the transfer destination ID "0123456789098765" to the printer storing section 68. Then, in the list storing section 70 (FIG. 11), the transfer destination ID "0123456789098765" is stored into transfer destination ID item corresponding to the reception number "00000001" (Step S411).

Continuously, the job managing section 67 notifies the transfer source portability telephone 62 of the registration end of the transfer destination ID through the network interface section 66 (Step S412).

In the transfer source portability telephone 62, the network interface section 72, when receiving the notification of the registration end of the transfer destination ID from the printer 61, sends the deletion instruction of the job ID to the deleting section 40 of the IC card section 33. Then, the deleting section 40 deletes the job ID "001a2b3c4d5e1234" from the job ID storing section 42 of the transfer source storing section 39 (Step S207). By this, the transfer process of the print authority in the printer system 60, is completed.

As stated above, after the print authority was transferred to the transfer destination portability telephone 63 from the transfer source portability telephone 62, the printer 61 is notified that the transfer is ended.

Moreover, in the Step S410, when judging that the registration ID disagrees with the transfer source ID, the judging section 69 notifies the job managing section 67 of the judgment result. The job managing section 67, when receiving the judgment result, notifies the transfer source portability telephone 62 that the print authority cannot be transferred through the network interface section 66 (Step S413). By this, the transfer process of the print authority in the printer system 60, is completed.

Figure 14:
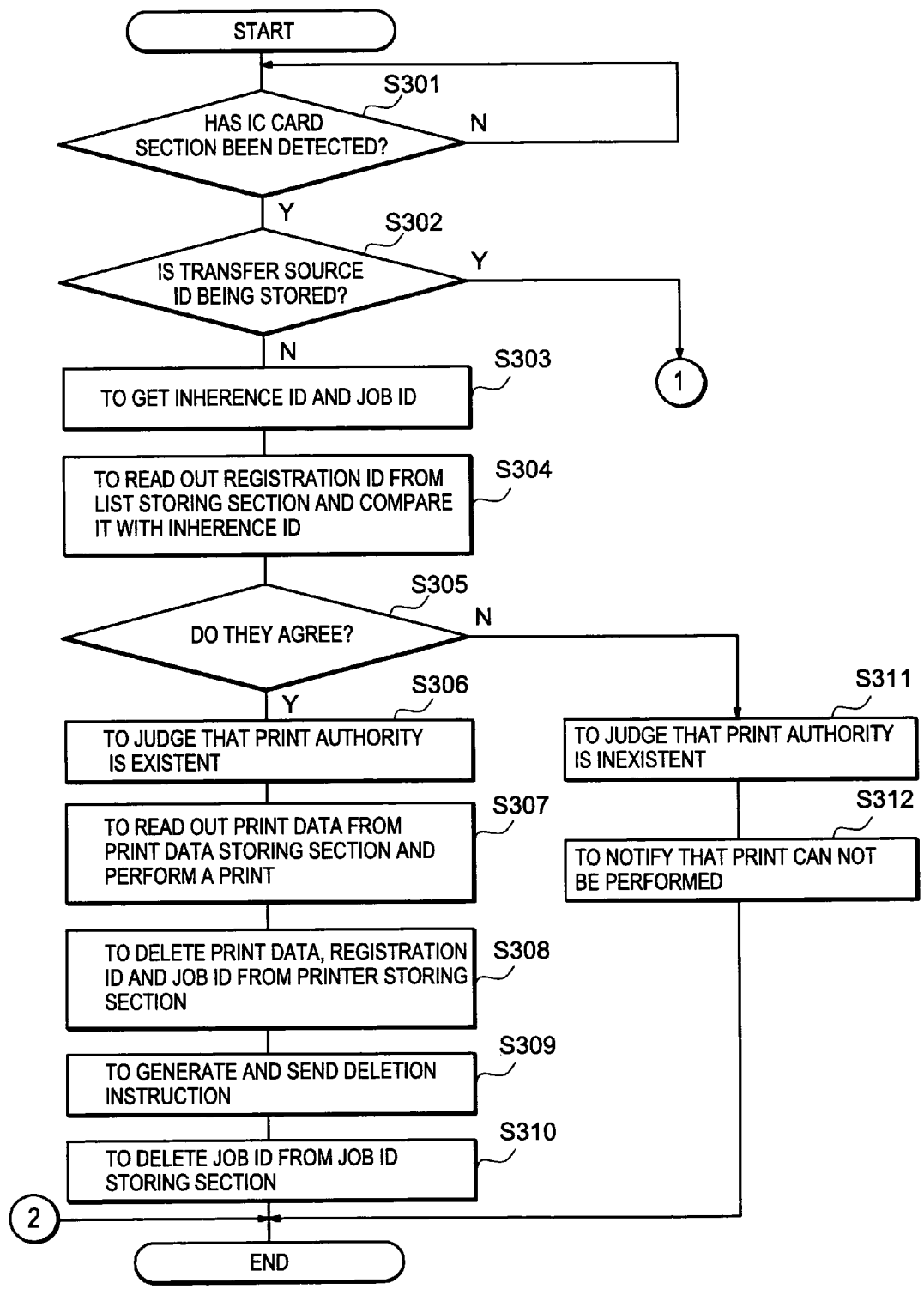
FIG. 14 is a first flow chart for explaining an authentication print operation in embodiment 2 of a printer system of the present invention.
Figure 15:
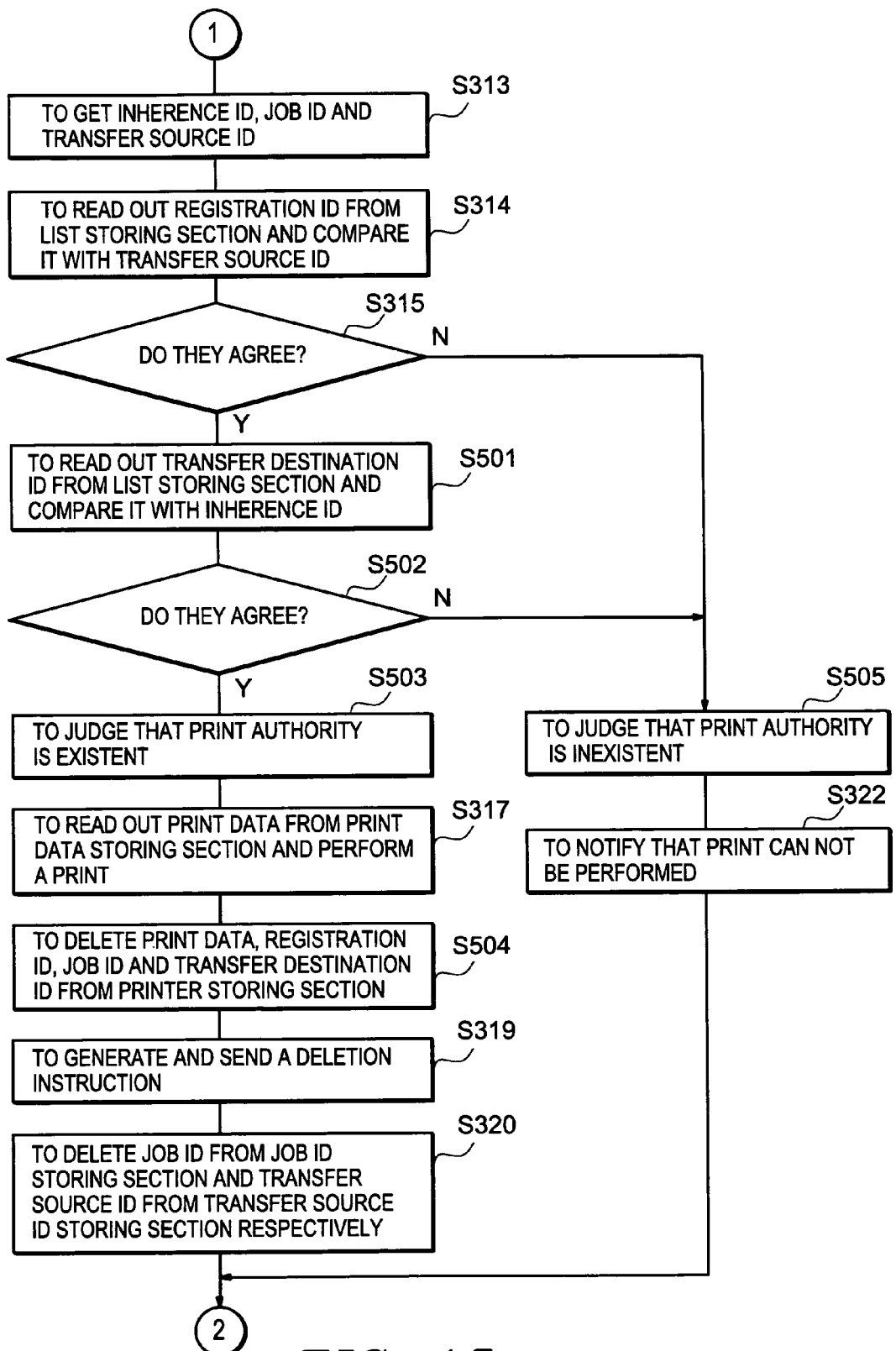
FIG. 15 is a second flow chart for explaining an authentication print operation in embodiment 2 of a printer system of the present invention.

Next, it is to explain the case of the authentication print process that performs the authentication process and the print process in the printer 61 according to flow charts represented by FIG. 14 and FIG. 15.

FIG. 14 is a first flow chart for explaining an authentication print operation in embodiment 2 of a printer system of the present invention; FIG. 15 is a second flow chart for explaining an authentication print operation in embodiment 2 of a printer system of the present invention.

Because the process that the transfer source portability telephone 62 executes the authentication print without transferring the print authority is the same as that in the embodiment 1, so its explanation will be omitted.

Here, it is to explain the case that the transfer destination portability telephone 63 that was transferred the print authority from the transfer source portability telephone 62 makes the printer 61 execute the authentication print according to flow charts represented in the FIG. 14 and the FIG. 15.

When the user of the transfer destination portability telephone 63 possesses the transfer destination portability telephone 63 and goes to the setting place of the printer 61 to make the transfer destination portability telephone 63 touch with the IC card reader writer 17 connected to the printer 61, the IC card reader writer 17 detects the IC card section 47 of the transfer destination portability telephone 63 (Step S301) and starts a communication with the IC card communicating section 48.

In the transfer destination portability telephone 63, because the transfer source ID is stored in the transfer source ID storing section 53 of the transfer destination storing section 49 (Step S302), the IC card communicating section 48 respectively reads out the inherence ID "0123456789098765" from the inherence ID storing section 51, the job ID "001a2b3c4d5e1234" from the job ID storing section 52 and the transfer source ID "0123456789abcdef" from the transfer source ID storing section 53 and sends them to the IC card reader writer 17. Then, the IC card reader writer 17 receives and gets the inherence ID, the job ID and the transfer source ID (Step S313). The inherence ID, the job ID and the transfer source ID that were got are sent to the job managing section 67 through the USB interface section 26.

The job managing section 67, when receiving the inherence ID, the job ID and the transfer source ID from the USB interface section 26, sends the inherence ID, the job ID and the transfer source ID to the judging section 69 for judging whether or not the print authority of the transfer destination portability telephone 63 is existent.

The judging section 69 searches the list storing section 70 (FIG. 11) on the basis of the received job ID "001a2b3c4d5e1234", firstly, reads out the registration ID "0123456789abcdef" which is correspondingly stored and compares the registration ID with the transfer source ID "0123456789abcdef" received from the job managing section 67 (Step S314).

When the registration ID agrees with the transfer source ID (Step S315), the judging section 69 reads out the transfer destination ID "0123456789098765" corresponding to the job ID "001a2b3c4d5e1234" from the list storing section 70 (FIG. 11) and compares the transfer destination ID with the inherence ID "0123456789098765" received from the job managing section 67 (Step S501).

When the transfer destination ID agrees with the inherence ID (Step S502), the judging section 69 judges that the print authority of the transfer destination portability telephone 63 is existent (Step S503).

Then, the judging section 69 reads out the reception number "00000001" corresponding to the job ID "001a2b3c4d5e1234" from the list storing section 70 (FIG. 11) and notifies the job managing section 67 of the judgment result and the reception number.

The job managing section 67 receives the notification that the print authority is existent, and sends the print instruction and the reception number "00000001" to the printing section 30 for releasing the print limitation concerning the print job of the reception number "00000001". The printing section 30 receives the print instruction and the reception number, reads out the corresponding print data "print data 1" from the print data storing section 31 (FIG. 2) and performs a print onto a record media (Step S317). When the print is completed, the printing section 30 notifies the job managing section 67 of the print completion and the reception number "00000001".

The job managing section 67 receives the notification of the print completion and the reception number and deletes each data corresponding to the reception number from the printer storing section 68 (Step S504). That is, the reception number "00000001" and the print data "print data 1" are deleted from the print data storing section 31 (FIG. 2); and the reception number "00000001", the registration ID "0123456789abcdef", the job ID "001a2b3c4d5e1234" and the transfer destination ID "0123456789098765" are deleted from the list storing section 70 (FIG. 11) (Step S504).

Continuously, the job managing section 67 generates the job ID and the deletion instruction of the transfer source ID concerning the transfer destination portability telephone 63 and sends the deletion instruction to the USB interface section 26. Then, the IC card reader writer 17 sends the deletion instruction to the transfer destination portability telephone 63 (Step S319).

In the transfer destination portability telephone 63, when the IC card communicating section 48 of the IC card section 47 receives the deletion instruction from the IC card reader writer 17, the IC card communicating section 48 sends the deletion instruction to the deleting section 50. Then, the deleting section 50 overwrites the data "0000000000000000" into the job ID storing section 52 of the transfer destination storing section 49 and the transfer destination ID storing section 53 of the transfer destination storing section 49 respectively and deletes the job ID "001a2b3c4d5e1234" and the transfer source ID "0123456789abcdef" that are stored (Step S320). By this, the authentication print process in the printer system 60, is completed.

As stated above, in the printer, the inherence ID is got from the portability telephone that was transferred the print authority, and the print time authentication is executed on the basis of the transfer destination ID and the inherence Id that are stored as transfer end information.

Moreover, when the registration ID disagrees with the transfer source ID in the Step S315, or when the transfer destination ID disagrees with the inherence ID in the Step S502, the judging section 69 judges that the print authority of the transfer destination portability telephone 63 is inexistent (Step S505) and notifies the job managing section 67 of the judgment result. The job managing section 67, after received the judgment result, makes a displaying section (not shown) display a message notifying that the print cannot perform (Step S322). By this, the authentication print process in the printer system 60, is completed.

As stated above, in the present embodiment, when the print authority is transferred, the printer is notified that the transfer of the print authority is ended by the transfer source portability telephone; the inherence ID of the transfer destination telephone is stored into the printer as a transfer end information. Therefore, because it is possible for the printer to prevent the execution of the authentication print by other portability telephone forging the job ID and the transfer source ID, so the strength of the security is realized.

Moreover, in the present embodiment, when the print authority is transferred, the inherence ID of the transfer source portability telephone 62 is stored into the transfer destination storing section 49 of the transfer destination portability telephone 63 as the transfer source ID together with the job ID, however, the structure to only store the job ID without storing the transfer source ID also can be adopted. In the case, the IC card reader writer 17 which is connected to the printer 61 reads out the inherence ID and the job ID from the detected IC card section 47 and sends them to the printer 61. Then, the printer 61 judges whether or not the transfer of the print authority is ended on the basis of an existence or an inexistence of the memory of the transfer destination ID in the list storing section 70. In the case that the transfer of the print authority is ended, the printer 61 reads out the transfer destination ID from the list storing section 70 and judges whether or not the print authority is existent through comparing the transfer destination ID with the inherence ID which is received from the IC card reader writer 17. By this, because the inherence ID of the transfer source portability telephone 62 is not deleted from the transfer destination portability telephone 63 after the authentication print is executed, so it is possible to prevent it from being abused.

THE UTILIZATION POSSIBILITY IN INDUSTRY

In the embodiment stated above, only such case is explained that an information processing apparatus of the present invention is applied to a printer. However, the information processing apparatus of the present invention is not limited the case. The present invention also can be applied to all image forming apparatuses such as facsimile, copying apparatus, color printer and the like; and can be applied to server which can communicate with the image forming apparatus and outputs data to the image forming apparatus according to a result of an authentication process.

The present invention is not limited to the foregoing embodiments but many modifications and variations are possible within the spirit and scope of the appended claims of the invention.

What is claimed is:

1. An information processing system comprising:
   an information processing apparatus for receiving data having an output limitation from a host apparatus and storing the data;
   a transfer source portability terminal for holding authority information representing release authority of the output limitation; and
   a transfer destination portability terminal that can communicate with the transfer source portability terminal;
   wherein the transfer source portability terminal includes a transfer source sending section for sending the authority information to the transfer destination portability terminal in order to transfer the release authority;
   wherein the transfer destination portability terminal includes a transfer destination receiving section for receiving the authority information from the transfer source portability terminal, a transfer destination storing section for storing the received authority information, and a transfer destination sending section for sending the authority information to the information processing apparatus;
   wherein the information processing apparatus includes an apparatus receiving section for receiving the authority information from the transfer destination portability terminal, a releasing section for releasing the output limitation based on the received authority information, and an outputting section for performing an output based on the data;
   wherein the transfer source sending section further sends transfer end information for presenting a transfer end of the release authority to the transfer destination portability terminal, to the information processing apparatus;
   wherein the transfer destination sending section further sends the terminal discrimination information of the transfer destination portability terminal to the information processing apparatus accompanied by a sending of the authority information; and
   wherein the information processing apparatus further includes an apparatus storing section for storing the transfer end information that is received from the transfer source portability terminal, a judging section for judging whether or not the authority information that is received from the apparatus receiving section is effective based on the terminal discrimination information that is received from the transfer destination portability terminal and the transfer end information, and an executing and controlling section for controlling the releasing section to execute the release when it is judged that the authority information is effective.

2. The information processing apparatus according to claim 1, wherein
the transfer end information is formed from transfer destination information representing a transfer destination of the authority information; and
the judging section performs the judgment according to whether or not the transfer destination discrimination information that is received by a first receiving section agrees with the terminal discrimination information that is received by a second receiving section.

3. The information processing apparatus according to claim 1, further comprising:
a sending section for sending a deletion instruction of authority information to the transfer destination portability terminal; and
a deleting section for deleting the transfer end information from the apparatus storing section when it is notified of a deletion end of the authority information by the transfer destination portability terminal.

4. The information processing apparatus according to claim 2, wherein the first receiving section is formed from a wireless communication section that receives the transfer end information through a wireless network.

5. The information processing apparatus according to claim 4, wherein the wireless communication section receives the transfer end information through electronic mail.

6. The information processing apparatus according to claim 2, wherein the second receiving section is formed from an IC card reader which receives the authority information and the terminal discrimination information via the wireless communication from the transfer destination portability terminal that takes a non-contact type IC card function having an IC (Integrated Circuit) chip.

7. The information processing apparatus according to claim 3, wherein the sending section is formed from an IC card writer that sends the deletion instruction via the wireless communication to the transfer destination portability terminal that takes the non-contact type IC card function having an IC chip.

8. The information processing apparatus according to claim 1, which is formed from an image forming apparatus that receives image data from the host apparatus, wherein the outputting section performs an image forming process based on the received image data.

9. The information processing apparatus according to claim 1, which is formed from a server that connects to an image forming apparatus, wherein the outputting section sends the image data that is received from the host apparatus to the image forming apparatus.

10. An information processing system, comprising:
an information processing apparatus for receiving data having an output limitation from a host apparatus and storing the data; a transfer source portability terminal for holding authority information representing release authority of the output limitation; and a transfer destination portability terminal that can communicate with the transfer source portability terminal,
wherein the transfer source portability terminal includes a transfer source sending section for sending the authority information to the transfer destination portability terminal in order to transfer the release authority;
wherein the transfer destination portability terminal includes a transfer destination receiving section for receiving the authority information from the transfer source portability terminal, a transfer destination storing section for storing the received authority information, and a transfer destination sending section for sending the authority information to the information processing apparatus; and
wherein the information processing apparatus includes an apparatus receiving section for receiving the authority information from the transfer destination portability terminal, a releasing section for releasing the output limitation based on the received authority information, and an outputting section for performing an output based on the data.

11. The information processing system according to claim 10,
wherein the information processing apparatus further includes an apparatus sending section for sending a deletion instruction of authority information to the transfer destination portability terminal; and
wherein the transfer destination portability terminal further includes a deleting section for deleting authority information from the transfer destination storing section when receiving the deletion instruction from the information processing apparatus.

12. The information processing system according to claim 10, wherein the authority information includes terminal discrimination information of the transfer source portability terminal.

13. The information processing system according to claim 12, wherein the transfer source portability terminal is formed from a portability terminal that takes a non-contact type IC card function having an IC chip; and the terminal discrimination information is formed from inherence discrimination information of the IC chip.

14. The information processing system according to claim 10, wherein the transfer source sending section sends the authority information to the transfer destination portability terminal through a wireless network.

15. The information processing system according to claim 14, wherein the transfer source sending section performs a sending to the transfer destination portability terminal of the authority information by electronic mail.

16. The information processing system according to claim 10, wherein
the transfer destination portability terminal is formed from a portability terminal that takes a non-contact type IC card function having an IC chip; and
the transfer destination sending section is formed from an IC card writer that sends the authority information to the information processing apparatus by wireless communication.

17. The information processing system according to claim 10, wherein
the transfer destination portability terminal is formed from a portability terminal that takes a non-contact type IC card function having an IC chip; and
the apparatus receiving section is formed from an IC card writer that receives the authority information from the transfer destination portability terminal by wireless communication.

18. The information processing system according to claim 11, wherein
the transfer destination portability terminal is formed from a portability terminal that takes a non-contact type IC card function having an IC chip; and the apparatus sending section is formed from an IC card writer that sends the deletion instruction to the transfer destination portability terminal by wireless communication.

19. The information processing system according to claim 10, wherein
the transfer source sending section further sends the transfer end information for presenting a transfer end of the release authority to the transfer destination portability terminal, to the information processing apparatus;
the transfer destination sending section further sends the terminal discrimination information of the transfer destination portability terminal to the information processing apparatus accompanied by a sending of the authority information; and
the information processing apparatus further includes an apparatus storing section for storing the transfer end information that is received from the transfer source portability terminal, a judging section for judging whether or not the authority information that is received from the apparatus receiving section is effective based on the terminal discrimination information that is received from the transfer destination portability terminal and the transfer end information, and an executing and controlling section for controlling the releasing section to execute the release when it is judged that the authority information is effective.

20. The information processing system according to claim 19, wherein
the transfer end information is formed from the transfer destination discrimination information representing the transfer destination of authority information; and
the judging section performs the judgment according to whether or not the transfer destination discrimination information agrees with the terminal discrimination information.

21. The information processing system according to claim 19, wherein
the information processing apparatus further includes an apparatus sending section for sending a deletion instruction of authority information to the transfer destination portability terminal;
the transfer destination portability terminal further includes a deleting section for deleting the authority information from the transfer destination storing section when receiving the deletion instruction from the information processing apparatus, and a notifying section for notifying the information processing apparatus of the deletion end of the authority information; and
the information processing apparatus deletes the transfer end information from the apparatus storing section when notified of the deletion end from the transfer destination portability terminal.

22. The information processing system according to claim 19, wherein the transfer source portability terminal is formed from the portability terminal taking the non-contact type IC card function having an IC chip; the authority information is formed from the inherence discrimination information of the IC chip; the transfer destination portability terminal is formed from the portability terminal of the non-contact type IC card function having the IC chip; and the terminal discrimination information is formed from the inherence discrimination information of the IC chip.

23. The information processing system according to claim 10, wherein the image forming apparatus receives image data from the host apparatus, wherein the outputting section performs an image forming process based on the received image data.

24. The information processing system according to claim 10, wherein a server connects to the image forming apparatus, and the outputting section sends the image data that is received from the host apparatus to the image forming apparatus.

* * * * *